United States Patent
Garcia et al.

(10) Patent No.: US 11,385,656 B2
(45) Date of Patent: Jul. 12, 2022

(54) SYSTEM, DEVICE AND METHOD OF IDENTIFYING AND UPDATING THE OPERATIONAL DESIGN DOMAIN OF AN AUTONOMOUS VEHICLE

(71) Applicants: Danson Evan Lu Garcia, Scarborough (CA); Ankur Agrawal, North York (CA); Chung Won Lee, Markham (CA); Nasif Nayeer, Scarborough (CA)

(72) Inventors: Danson Evan Lu Garcia, Scarborough (CA); Ankur Agrawal, North York (CA); Chung Won Lee, Markham (CA); Nasif Nayeer, Scarborough (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/749,602

(22) Filed: Jan. 22, 2020

(65) Prior Publication Data

US 2021/0223788 A1    Jul. 22, 2021

(51) Int. Cl.
*G01C 21/32*        (2006.01)
*B60W 60/00*       (2020.01)
*G05D 1/02*         (2020.01)

(52) U.S. Cl.
CPC ....... *G05D 1/0274* (2013.01); *B60W 60/0053* (2020.02); *B60W 60/0057* (2020.02);
(Continued)

(58) Field of Classification Search
None
See application file for complete search history.

(56) References Cited

U.S. PATENT DOCUMENTS 10,126,136 B2    11/2018    Iagnemma
10,831,207 B1 *  11/2020    Leung ................. B60W 50/045
(Continued)

FOREIGN PATENT DOCUMENTS

CN    103542858 A    1/2014
CN    104973071 A    10/2015
(Continued)

OTHER PUBLICATIONS

Thorn et al. ("A Framework for Automated Driving System Testable Cases and Scenarios", Sep. 2018. U.S. Department of Transportation, National Highway Traffic Safety Administration. Report No. DOT HS 812 623, pertinent pages: all) (Year: 2018).*

(Continued)

*Primary Examiner* — James J Lee
*Assistant Examiner* — Tawri M Matsushige

(57) ABSTRACT

A system, method and processor readable medium for identifying an operational design domain (ODD) for operation of an autonomous driving system (ADS). In one aspect, a proposed map is used to generate a geographic dataset. Performance of the ADS is evaluated against the geographic dataset under a range of environment& conditions, thereby identifying a bounded-risk portion of a proposed condition space defined by the proposed map and the range of environmental conditions. The operational design domain is identified based on the bounded-risk portion of the proposed condition space. The ODD can be updated as additional data is received. When a vehicle using the ADS is likely to leave the ODD, an operator can be alerted.

20 Claims, 10 Drawing Sheets

(52) U.S. Cl.
CPC ..... *G01C 21/32* (2013.01); *G05D 2201/0212* (2013.01); *G05D 2201/0213* (2013.01)

(56) References Cited

U.S. PATENT DOCUMENTS

| | | | | |
|---|---|---|---|---|
| 10,872,379 | B1* | 12/2020 | Nepomuceno | G08G 1/0141 |
| 10,909,629 | B1* | 2/2021 | Madigan | B60R 16/0232 |
| 2016/0171521 | A1* | 6/2016 | Ramirez | G08G 1/0112 701/409 |
| 2017/0309092 | A1* | 10/2017 | Rosenbaum | G01M 17/007 |
| 2018/0075538 | A1* | 3/2018 | Konrardy | B60Q 9/00 |
| 2018/0276485 | A1* | 9/2018 | Heck | G05D 1/0088 |
| 2019/0049259 | A1 | 2/2019 | Galan-Oliveras et al. | |
| 2019/0163185 | A1* | 5/2019 | Bin-Nun | B60W 50/045 |
| 2019/0232955 | A1* | 8/2019 | Grimm | B60W 50/06 |
| 2019/0258251 | A1* | 8/2019 | Ditty | G06K 9/00805 |
| 2020/0284597 | A1* | 9/2020 | Chellapilla | G06Q 10/02 |
| 2021/0107499 | A1* | 4/2021 | Brannstrom | B60W 50/04 |
| 2021/0109528 | A1* | 4/2021 | Heyl | G05D 1/0212 |
| 2021/0149395 | A1* | 5/2021 | Jonsson | B60W 50/082 |

FOREIGN PATENT DOCUMENTS

| | | |
|---|---|---|
| CN | 110276985 A | 9/2019 |
| CN | 110554691 A | 12/2019 |
| WO | 2019037226 A1 | 2/2019 |

OTHER PUBLICATIONS

General Motors "2018 Self-Driving Safety Report" https://www.gm.com/content/dam/company/docs/US/en/gmcom/gmsafetyreport.pdf 2018.

Ford Motor Company "A Matter of Trust: Ford's Approach to Developing Self-Driving Vehicles"; https://media.ford.com/content/dam/fordmedia/pdf/Ford_AV_LLC_FINAL_HR_2.pdf 2018.

Waymo : Waymo Safety Report: On the Road to Fully Self-Driving; https://storage.googleapis.com/sdc-prod/v1/safety-report/waymo-safety-report-2017.pdf 2017.

US Department of Transportation Federal Highway Administration Office of Transportaiton Operations "United States Road Symbol Signs" https://mutcd.fhwa.dot.gov/services/publications/fhwaop02084/us_road_symbol_signs.pdf 2002.

Saxena, Ujjwal; "Image Augmentation: Make it rain, make it snow. How to Modify photos to train self-driving cars" https://www.freecodecamp.org/news/image-augmentation-make-it-rain-make-it-snow-how-to-modify-a-photo-with-machine-learning-163c0cb3843f Apr. 9, 2018.

Saxena, Ujjwal; Automold-Road-Augmentation-Library; https://github.com/UjjwalSaxena/Automold-Road-Augmentation-Library 2018.

Cruise; Create What's Next; https://www.getcruise.com/technology 2020.

Wiggers, Kyle "GM's Cruise is preparing for a self-driving future in the cloud" https://venturebeat.com/2019/04/20/gms-cruise-is-preparing-for-a-self-driving-future-in-the-cloud/ Apr. 20, 2019.

RFpro Driving Simulation for Virtual Testing http://www.rfpro.com/ 2020.

CARLA Open-source simulator for autonomous driving research; http://carla.org/ 2020.

NVIDIA Drive Constellation: Virtual Reality Autonomous Vehicle Simulator https://www.nvidia.com/en-us/self-driving-cars/drive-constellation 2019.

* cited by examiner

SYSTEM, DEVICE AND METHOD OF IDENTIFYING AND UPDATING THE OPERATIONAL DESIGN DOMAIN OF AN AUTONOMOUS VEHICLE

TECHNICAL FIELD

The present disclosure relates to autonomous vehicles, and in particular, to a system, device and method for identifying and updating the Operational Design Domain (ODD) of an autonomous vehicle

BACKGROUND

Autonomous driving systems (ADS) are used to operate vehicles autonomously or semi-autonomously. The domain within which a given ADS is intended to function is called the operational design domain (ODD). An ODD is typically defined by a geographic boundary or set of roadways, and may also include additional conditions or constraints applicable to operation of the ADS. An ODD may identify roadway types (highway, local roads, etc.) on which the ADS is intended to operate safely; types of geography (urban, hills, mountains, desert, etc.) in which the ADS is intended to operate safely; a speed range for safe operation; and/or environmental conditions in which the ADS is intended to operate (precipitation, road conditions, temperature, lighting conditions, etc.).

Typically an ODD, including both map boundaries and environmental conditions, is defined before the ADS is deployed on public roads for testing. Typical methods for identifying the ODD begin by geo-fencing a geographic area based on business or strategic considerations. Then the geo-fenced area is tested: a vehicle equipped with the ADS is deployed to the geo-fenced area for on-road testing and empirical validation using the ADS to drive the vehicle, typically with a safety driver in the vehicle who can intervene in case of ADS failure. Once ADS operation has been tested or validated, the geo-fenced area is then considered as part of the ODD.

These existing methods rely heavily on safety drivers to intervene while the ADS is being evaluated. This is problematic, for at least four reasons.

First, it requires safety drivers to be fully alert and ready to intervene at all times, without giving them any indication in advance of what conditions (e.g. which specific roadways or locations, which environmental conditions) present a higher or lower risk of ADS failure. A safety driver may not realize that the ADS is failing until an accident is imminent, at which time the safety driver may not be able to respond quickly enough to avert an accident. For example, a safety driver may take a certain amount of time to realize that the ADS has filed to correctly identify an object before he or she can react to that failure, resulting in a high total reaction time for the vehicle.

Second, it is unfair to safety drivers to ask them to be fully alert at all times while monitoring the ADS, and safety drivers are likely to burn out and lose focus over time.

Third, when the capabilities of the ADS change over time, such as by updates to software or hardware, safety drivers' knowledge of the ADS's capabilities becomes unreliable.

Fourth, once the ADS has been tested in the geo-fenced area, the area is typically claimed as the ODD regardless of the number of safety driver interventions that were required during testing, as there is no systematic way to distinguish and delimit safe and unsafe portions of the planned ODD.

An example of these existing techniques for generating an ODD is shown in the flowchart of FIG. 1. This known method 10 begins with selecting a geographic area based on projected business strategies 12. At step 14, a high-definition map of the area is created. Preliminary basic tests of the ADS are then typically run at step 16, either in simulation or on a closed course that is not representative of the actual area. At step 18, a safety driver is informed about the capabilities of the ADS. At step 20, the ADS is deployed for road testing within the area, accompanied by the safety driver. The safety driver has the responsibility of intervening whenever safety requires it. When road testing is deemed complete, at step 22, the entire area is claimed as the ODD, regardless of the number of safety drivers interventions that were necessary during testing.

Many examples of these current techniques are publicly known. GM has provided a safety report showing the use of public roads as a testing ground for an arbitrarily chosen ODD. It explicitly states that high-risk areas of the ODD are only identified through test drives on public roads. Similarly, Ford has published a safety report showing that the safety driver (called as operator) needs to be aware of the system's capabilities, and that the source of the ODD is simply expectations and projections instead of reality. Furthermore, safety drivers need to be continually briefed on changes to the capabilities of the ADS and remember the current capabilities when operating the vehicle. Similar statements about the need to educate and update safety drivers to the capabilities of the ADS appear in a further safety report published by Waymo.

SUMMARY

The present disclosure provides a system, method and processor readable medium for identifying an operational design domain (ODD) for operation of an autonomous driving system (ADS) for a vehicle. The present disclosure may exhibit one or several advantages over existing techniques for defining the ODD described above.

First, in the present disclosure the ODD may be defined with respect to objective and systematic measures of risk based on the capabilities of the ADS, thereby capturing the full competencies of the ADS and aligning the ODD with business objectives, rather than simply defining the ODD a priori based on a projected business model.

Second, the ODD may enable the ADS to inform the safety operator when the ADS is operating outside of bounded risk parameters and is therefore more likely to need intervention, rather than relying on the ability of the safety driver to memorize the complex and potentially changing capabilities of the ADS as in the techniques described above.

Third, the present disclosure may obviate the need for premature unsafe road testing, which is dangerously similar to blind testing, unlike the existing techniques described above which may deploy autonomous vehicles for road testing in areas where the risks are outside of any predetermined risk parameters.

Fourth, unlike existing techniques, the present disclosure may provide a formal way to update the ODD as further data is gathered and compared to the performance of the ADS and the risk tolerance of the entity managing the project.

Based on these potential advantages, the present disclosure may allow reliable identification of an ODD before the ADS is ever deployed for road testing. By proving that the ODD has bounded risk before road testing begins, the present disclosure may avoid the existing techniques' approach of overestimating confidence initially and then relying on safety drivers to intervene when this overconfidence manifests as a potential accident. The present disclosure may enable an ADS to operate within a defined ODD such that the expected value of incurred loss is ensured to be bounded under a predetermined threshold, such as a dollar value threshold.

In accordance with a first aspect of the present disclosure, there is provided a method for identifying an operational design domain for operation of an autonomous driving system (ADS) for a vehicle. The method includes receiving proposed condition space data comprising data representative of a proposed map, generating a geographic dataset using the proposed condition space, evaluating performance of the ADS using the geographic dataset, identifying a bounded-risk portion of the proposed condition space based on the ADS performance, and identifying the operational design domain based on the bounded-risk portion of the proposed condition space.

In accordance with a second aspect of the present disclosure, there is provided a system for identifying an operational design domain (ODD) for operation of an autonomous driving system (ADS) for a vehicle.

In accordance with one embodiment of the second aspect of the present disclosure, the system comprises a processor system and a memory coupled to the processor system. The memory tangibly stores thereon executable instructions that, when executed by the processor system, cause the system to receive a proposed condition space data comprising data representative of a proposed map, generating a geographic dataset using the proposed condition space, evaluate performance of the ADS using the geographic dataset, identifying a bounded-risk portion of the proposed condition space based on ADS performance, and identify the operational design domain based on the bounded-risk portion of the proposed condition space.

In accordance with some embodiments of the first or second aspect of the present disclosure, the proposed condition space further comprises a proposed range of environmental conditions, evaluating the ADS comprises evaluating performance of the autonomous driving system within the proposed range of environmental conditions using the geographic dataset, and the bounded-risk portion of the proposed condition space comprises a set of combinations of locations within the proposed map with environmental conditions within the proposed range of environmental conditions having a bounded risk. The use of environmental conditions improves the robustness of the system or method in assessing risk.

In accordance with some embodiments of the first or second aspect of the present disclosure, using the proposed condition space to generate the geographic dataset comprises receiving a plurality of map features of the proposed map. The use of map features improves the robustness of the system or method in assessing risk presented by specific features likely to be encountered by the vehicle.

In accordance with some embodiments of the first or second aspect of the present disclosure, the map features of the proposed map comprise a plurality of nodes corresponding to locations on the proposed map, a plurality of roadway segments, each corresponding to a path between two of the nodes, a plurality of routes, each comprising one or more of the segments, and a plurality of object types, each object type having one or more probabilities of encounter, each probability of encounter being associated with one of the segments. The use of probabilities for encountering specific object types improves the robustness of the system for assessing risk based on the prevalence of each object type in a given segment of a route within the proposed map area.

In accordance with some embodiments of the first or second aspect of the present disclosure, the bounded risk comprises a maximum risk metric value falling below a risk threshold, the maximum risk metric value being calculated as a highest route risk metric value of a plurality of route risk metric values corresponding to a bounded-risk plurality of routes located within the bounded-risk portion of the proposed map. The use of a maximum risk metric falling below a risk threshold ensures that the maximum risk on any portion of a route within the bounded risk portion of the proposed map will be below a risk threshold defined by the risk tolerance of the project.

In accordance with some embodiments of the first or second aspect of the present disclosure, each route risk metric value is calculated by summing an expected risk for each of a plurality of object types present on the corresponding route, the expected risk for an object type being calculated as the product of a severity value indicating an expected severity of failure of the ADS to react appropriately to the object type on the route, an exposure value indicating a prevalence of the object type on the route, and a likelihood of failure value indicating the likelihood that the ADS will fail to react appropriately to the object type on the route, and wherein the likelihood of failure value is based on the evaluation of ADS performance within the proposed range of environmental conditions using the geographic dataset. The use of values for severity, exposure, and likelihood of failure results in a robust risk metric corresponding to overall likelihood of ADS failure.

In accordance with some embodiments of the first aspect of the present disclosure, the system further comprises a vehicle comprising the ADS and configured to be operated by an operator, wherein the instructions, when executed by the processor system, further cause the system to determine that the vehicle is likely to exit the operational design domain, and in response to determining that the vehicle is likely to exit the operational design domain, alert the operator. As noted above, the ability to alert an operator to the vehicle exiting the ODD allows the operator to focus attention on the unbounded-risk portions of vehicle travel.

In accordance with some embodiments of the second aspect of the present disclosure, the method further comprises determining that a vehicle using the ADS for autonomous operation is likely to exit the operational design domain, and in response to determining that the vehicle is likely to exit the operational design domain, alerting an operator of the vehicle. As noted above, the ability to alert an operator to the vehicle exiting the ODD allows the operator to focus attention on the unbounded-risk portions of vehicle travel.

In accordance with some embodiments of the first aspect of the present disclosure, the instructions, when executed by the processor system, further cause the system to, after identifying the operational design domain, receive additional data, re-evaluate performance of the ADS using the geographic dataset and the additional data, thereby updating the bounded-risk portion of the proposed condition space, and update the operational design domain based on the updated bounded-risk portion of the proposed condition space. As noted above, this allows the ODD to be updated upon receipt of updated data to keep the ODD accurate and consistent with the latest information.

In accordance with some embodiments of the second aspect of the present disclosure, the method further comprises, after the step of identifying the operational design domain, receiving additional data, re-evaluating performance of the ADS using the geographic dataset and the additional data, thereby updating the bounded-risk portion of the proposed condition space, and updating the operational design domain based on the updated bounded-risk portion of the proposed condition space. As noted above, this allows the ODD to be updated upon receipt of updated data to keep the ODD accurate and consistent with the latest information.

In accordance with some embodiments of the first or second aspect of the present disclosure, the additional data is selected from the group consisting of: updated proposed map data, updated geographic dataset data, updated expected risk data, updated risk threshold data, and updated ADS performance data. These various data types may all potentially be relevant to updating the ODD.

In accordance with a yet further aspect of the present disclosure, there is provided a non-transitory processor readable medium having tangibly stored thereon executable instructions that, when executed by a processor, cause the processor to perform a method according to one of the embodiments of the second aspect of the present disclosure.

DESCRIPTION OF EXAMPLE EMBODIMENTS

Figure 1:
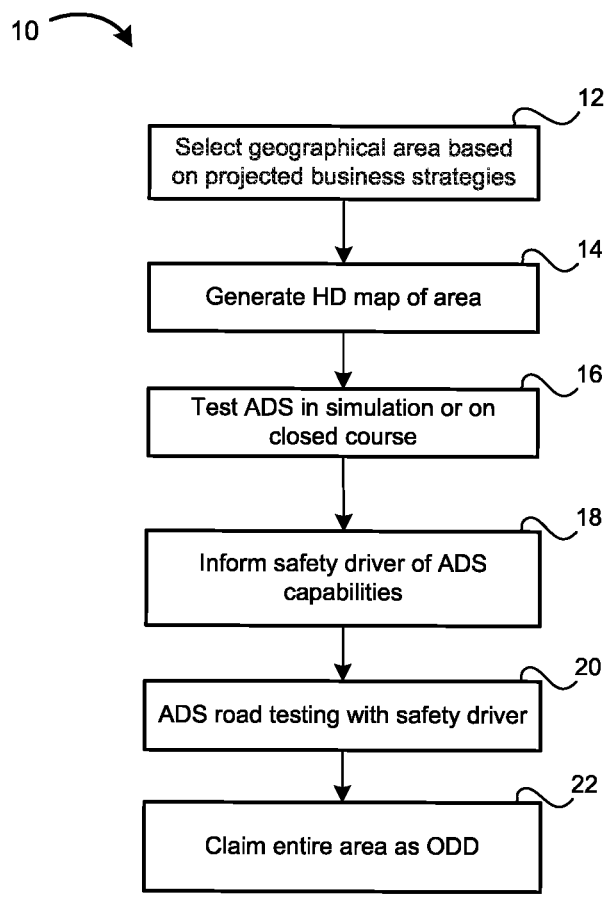
FIG. 1 is a flowchart showing a known method for identifying an ODD for an ADS.

The present disclosure is made with reference to the accompanying drawings, in which embodiments are shown. However, many different embodiments may be used, and thus the description should not be construed as limited to the embodiments set forth herein. Rather, these embodiments are provided so that this disclosure will be thorough and complete. Wherever possible, the same reference numbers are used in the drawings and the following description to refer to the same elements, and prime notation is used to indicate similar elements, operations or steps in alternative embodiments. Separate boxes or illustrated separation of functional elements of illustrated systems and devices does not necessarily require physical separation of such functions, as communication between such elements may occur by way of messaging, function calls, shared memory space, and so on, without any such physical separation. As such, functions need not be implemented in physically or logically separated platforms, although they are illustrated separately for ease of explanation herein. Different devices may have different designs, such that although some devices implement some functions in fixed function hardware, other devices may implement such functions in a programmable processor with code obtained from a machine-readable medium. Lastly, elements referred to in the singular may be plural and vice versa, except where indicated otherwise either explicitly or inherently by context.

For convenience, the present disclosure describes example embodiments of methods and systems with reference to a vehicle, such as a car, truck, bus, boat or ship, submarine, aircraft, warehouse equipment, construction equipment, tractor or other farm equipment. The teachings of the present disclosure are not limited to any particular type of vehicle, and may be applied to vehicles that do not carry passengers as well as vehicles that do carry passengers. The teachings of the present disclosure may also be implemented in mobile robot vehicles including, but not limited to, autonomous vacuum cleaners, rovers, lawn mowers, unmanned aerial vehicle (UAV), and other objects.

Figure 2:
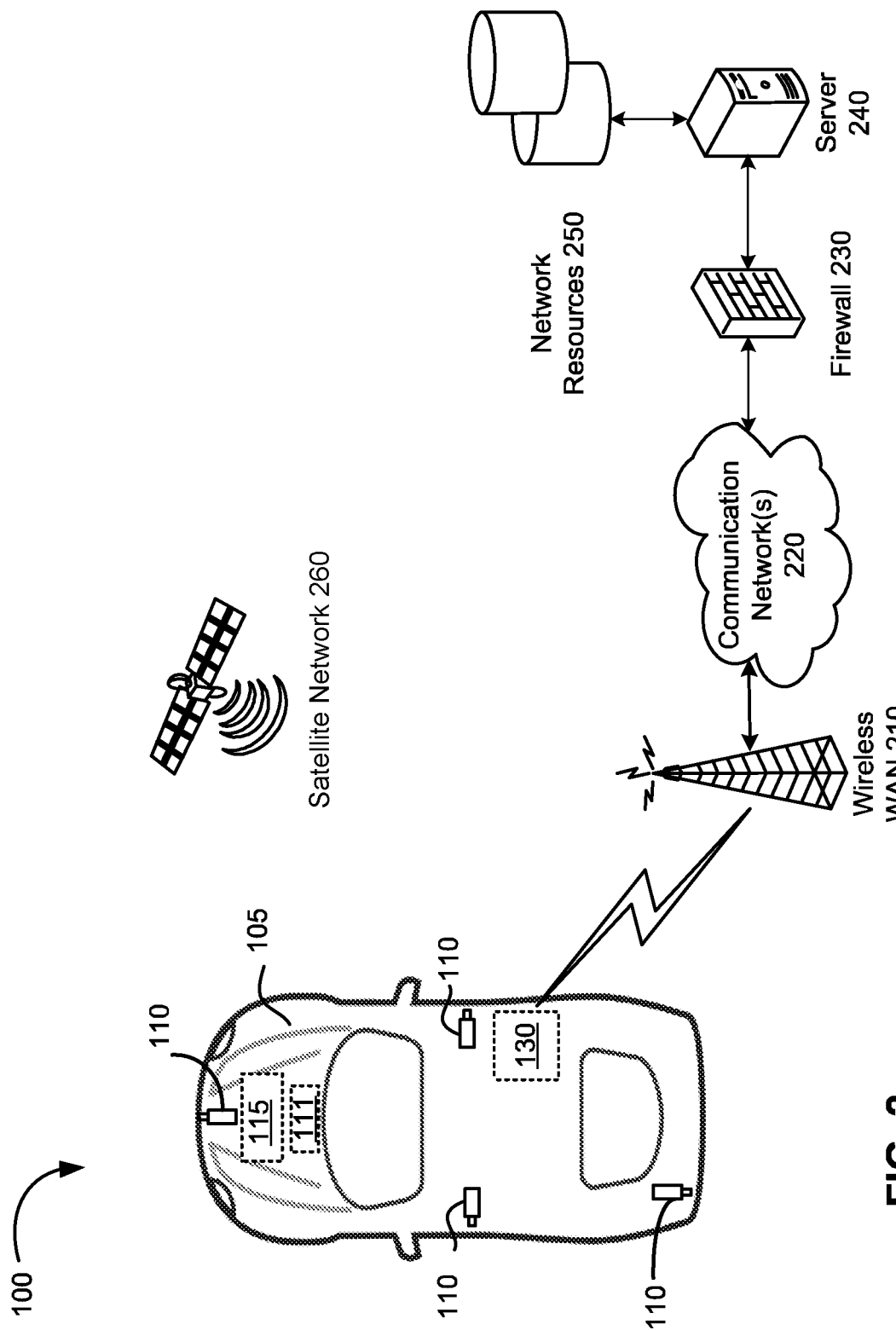
FIG. 2 is a schematic diagram of a vehicle operating autonomously in an environment that includes a communication system in accordance with example embodiments of the present disclosure.
Figure 3A:
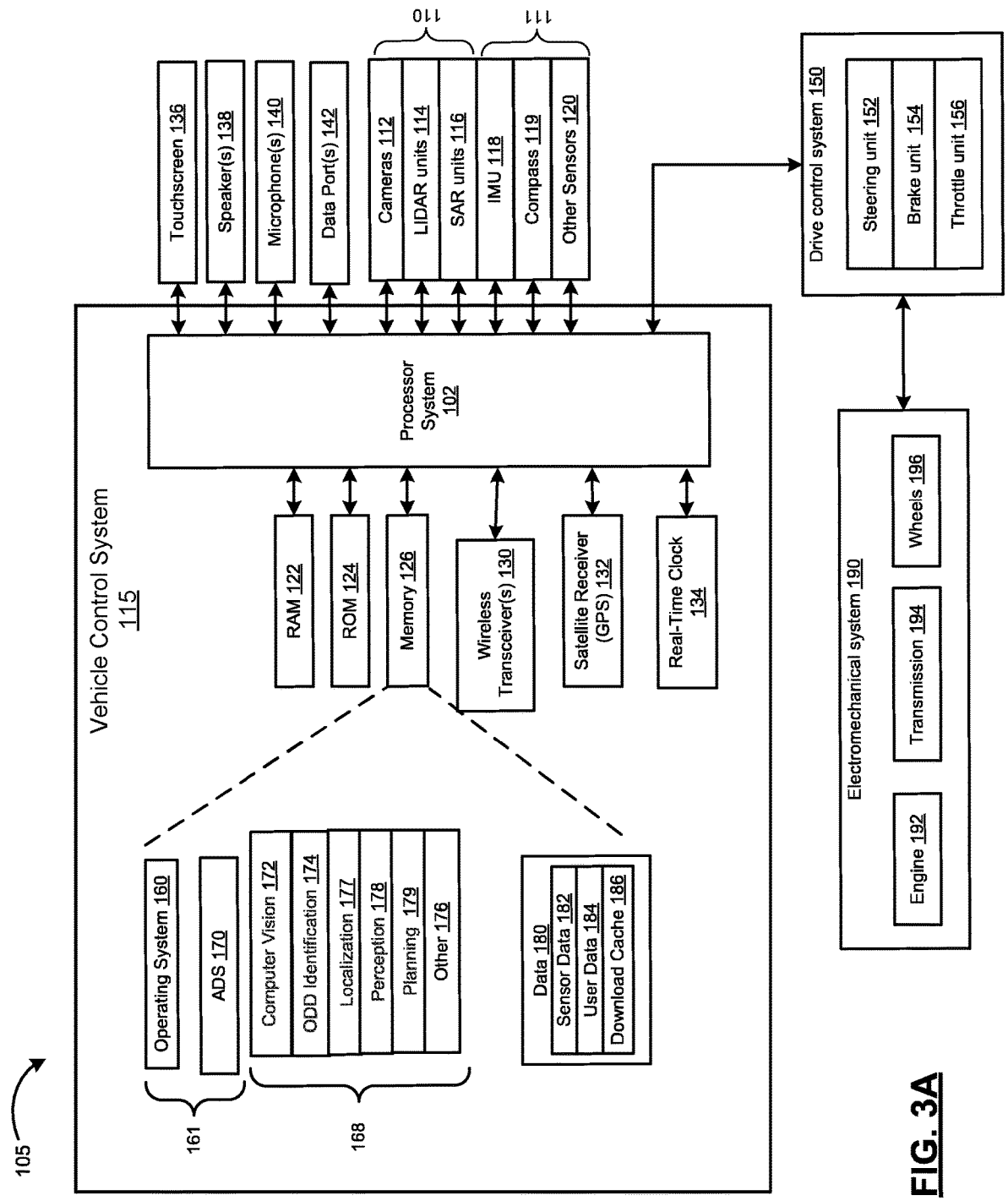
FIG. 3A is a block diagram of the vehicle of FIG. 2 in accordance with one example embodiment of the present disclosure.

FIG. 2 is a schematic diagram showing an environment 100 in which a vehicle 105 operates in. The environment includes a communication system 100 that communicates with the vehicle 105. The vehicle 105 includes a vehicle control system 115. The vehicle control system 115, shown in greater detail in FIG. 3A, is coupled to a drive control system 150 and a mechanical system 190 of the vehicle 105, as described below. The vehicle control system 115 can in various embodiments allow the vehicle 105 to be operable in one or more of a fully-autonomous, semi-autonomous or fully user-controlled mode.

The vehicle 105 may include sensors, shown here as a plurality of environment sensors 110 that collect data about the external environment 100 surrounding the vehicle 105 (hereinafter referred to as environment sensors 110), and a plurality of sensors 111 that collect data about the operating conditions of the vehicle 105 (hereinafter called vehicle sensors 111). The environment sensors 110 may, for example, include one or more camera units 112, one or more light detection and ranging (LiDAR) units 114, and one or more radar units such as synthetic aperture radar (SAR) units 116. The camera (units) 112, LiDAR unit(s) 114 and SAR unit(s) 116 are mounted to and located about the vehicle 105 and are each coupled to the vehicle control system 115, as described below. In an example embodiment, the camera unit(s) 112, LiDAR units 114 and SAR units 116 are mounted to and located at the front, rear, left side and right side of the vehicle 105 to collect data about the external environment 100 located in front, rear, left side and right side of the vehicle 105. For each type environment sensor 110, individual units are mounted or otherwise located to have different fields of view (FOVs) or coverage areas to capture data about the environment surrounding the vehicle 105. In some examples, for each type of environment sensor 110, the FOVs or coverage areas of some or all of the adjacent environment sensors 110 are partially overlapping. Accordingly, the vehicle control system 115 receives data about the external environment of the vehicle 105 as collected by camera unit(s) 112, LiDAR unit(s) 114 and SAR unit(s) 116.

Vehicle sensors 111 can include an inertial measurement unit (IMU) 118 that senses the vehicle's 105 specific force and angular rate using a combination of accelerometers and gyroscopes and provides an orientation of the vehicle based on the vehicle's 105 sensed specific force and angular rate, an electronic compass 119, and other vehicle sensors 120 such as a speedometer, a tachometer, wheel traction sensor, transmission gear sensor, throttle and brake position sensors, and steering angle sensor. The vehicle sensors 111, when active, repeatedly (e.g., in regular intervals) sense the environment and provide data about the operating conditions of the vehicle 105 to the vehicle control system 115 in real-time or near real-time. For example, the vehicle control system 115 may collect data about a position of the vehicle 105 using signals received from a satellite receiver 132. The vehicle control system 115 may also receive data about an orientation of the vehicle 105 from the IMU 118. The vehicle control system 115 may determine a linear speed of the vehicle 105, angular speed of the vehicle 105, acceleration of the vehicle 105, engine RPMs of the vehicle 105, transmission gear and tire grip of the vehicle 105, among other factors, using data about the operating conditions of the vehicle 105 provided by one or more of the satellite receivers 132, the IMU 118, and other vehicle sensors 120.

The vehicle control system 115 may also comprise one or more wireless transceivers 130 that enable the vehicle control system 115 to exchange data and optionally voice communications with a wireless wide area network (WAN) 210 of the communication system 100. The vehicle control system 115 may use the wireless WAN 210 to access a server 240, such as a driving assist server, via one or more communications networks 220, such as the Internet. The server 240 may be implemented as one or more server modules in a data center and is typically located behind a firewall 230. The server 240 is connected to network resources 250, such as supplemental data sources that may be used by the vehicle control system 115.

The environment 100 comprises a satellite network 260 comprising a plurality of satellites in addition to the wireless WAN 210. The vehicle control system 115 comprises the satellite receiver 132 (FIG. 2) that may use signals received by the satellite receiver 132 from the plurality of satellites in the satellite network 260 to determine its position. The satellite network 260 typically comprises a plurality of satellites which are part of at least one Global Navigation Satellite System (GNSS) that provides autonomous geospatial positioning with global coverage. For example, the satellite network 260 may be a constellation of GNSS satellites. Example GNSSs include the United States NAVSTAR Global Positioning System (GPS) or the Russian GLObal NAvigation Satellite System (GLONASS). Other satellite navigation systems which have been deployed or which are in development include the European Union's Galileo positioning system, China's BeiDou Navigation Satellite System (BDS), the Indian regional satellite navigation system, and the Japanese satellite navigation system.

FIG. 3A illustrates selected components of the vehicle 105 in accordance with an example embodiment of the present disclosure. As noted above, the vehicle 105 comprises a vehicle control system 115 that is connected to a drive control system 150 and a mechanical system 190 as well as to the environment sensors 110 and the vehicle sensors 111. The vehicle 105 also comprises various structural elements such as a frame, doors, panels, seats, windows, mirrors and the like that are known in the art but that have been omitted from the present disclosure to avoid obscuring the teachings of the present disclosure. The vehicle control system 115 includes a processor system 102 that is coupled to a plurality of components via a communication bus (not shown) which provides a communication path between the components and the processor system 102. The processor system 102 is coupled to a drive control system 150, Random Access Memory (RAM) 122, Read Only Memory (ROM) 124, persistent (non-volatile) memory 126 such as flash erasable programmable read only memory (EPROM) (flash memory), one or more wireless transceivers 130 for exchanging radio frequency signals with the wireless WAN 210, a satellite receiver 132 for receiving satellite signals from the satellite network 260, a real-time clock 134, and a touchscreen 136. The processor system 102 may include one or more processing units, including for example one or more central processing units (CPUs), one or more graphical processing units (GPUs), one or more tensor processing units (TPUs), and other processing units.

The one or more wireless transceivers 130 may comprise one or more cellular (RF) transceivers for communicating with a plurality of different radio access networks (e.g., cellular networks) using different wireless data communication protocols and standards. The vehicle control system 115 may communicate with any one of a plurality of fixed transceiver base stations (one of which is shown in FIG. 1) of the wireless WAN 210 (e.g., cellular network) within its geographic coverage area. The one or more wireless transceiver(s) 130 may send and receive signals over the wireless WAN 210. The one or more wireless transceivers 130 may comprise a multi-band cellular transceiver that supports multiple radio frequency bands.

The one or more wireless transceivers 130 may also comprise a wireless local area network (WLAN) transceiver for communicating with a WLAN (not shown) via a WLAN access point (AP). The WLAN may comprise a Wi-Fi wireless network which conforms to IEEE 802.11x standards (sometimes referred to as Wi-Fi®) or other communication protocol.

The one or more wireless transceivers 130 may also comprise a short-range wireless transceiver, such as a Bluetooth® transceiver, for communicating with a mobile computing device, such as a smartphone or tablet. The one or more wireless transceivers 130 may also comprise other short-range wireless transceivers including but not limited to Near field communication (NFC), IEEE 802.15.3a (also referred to as UltraWideband (UWB)), Z-Wave, ZigBee, ANT/ANT+ or infrared (e.g., Infrared Data Association (IrDA) communication).

The real-time clock 134 may comprise a crystal oscillator that provides accurate real-time time data. The time data may be periodically adjusted based on time data received through satellite receiver 132 or based on time data received from network resources 250 executing a network time protocol.

The touchscreen 136 comprises a display such as a color liquid crystal display (LCD), light-emitting diode (LED) display or active-matrix organic light-emitting diode (AMO-LED) display, with a touch-sensitive input surface or overlay connected to an electronic controller. Additional input devices (not shown) coupled to the processor system 102 may also be provided including buttons, switches and dials.

The vehicle control system 115 also includes one or more speakers 138, one or more microphones 140 and one or more data ports 142 such as serial data ports (e.g., Universal Serial Bus (USB) data ports). The vehicle control system 115 may also include other sensors 120 such as tire pressure sensors (TPSs), door contact switches, light sensors, proximity sensors, etc.

The drive control system 150 serves to control movement of the vehicle 105. The drive control system 150 comprises a steering unit 152, a brake unit 154 and a throttle (or acceleration) unit 156, each of which may be implemented as software modules or control blocks within the drive control system 150. The steering unit 152, brake unit 154 and throttle unit 156 process, when in fully or semi-autonomous driving mode, receives navigation instructions from an autonomous driving system (ADS) 170 (for autonomous and/or semi-autonomous driving mode) and generates control signals to control one or more of the steering, braking and throttle of the vehicle 105. The drive control system 150 may include additional components to control other aspects of the vehicle 105 including, for example, control of turn signals and brake lights.

The electromechanical system 190 receives control signals from the drive control system 150 to operate the electromechanical components of the vehicle 105. The electromechanical system 190 effects physical operation of the vehicle 105. The electromechanical system 190 comprises an engine 192, a transmission 194 and wheels 196. The engine 192 may be a gasoline-powered engine, a battery-powered engine, or a hybrid engine, for example. Other components may be included in the mechanical system 190, including, for example, turn signals, brake lights, fans and windows.

A graphical user interface (GUI) of the vehicle control system 115 is rendered and displayed on the touchscreen 136 by the processor system 102. A user may interact with the GUI using the touchscreen 136 and optionally other input devices (e.g., buttons, dials) to select a driving mode for the vehicle 105 (e.g., fully autonomous driving mode or semi-autonomous driving mode) and to display relevant data and/or information, such as navigation information, driving information, parking information, media player information, climate control information, etc. The GUI may comprise a series of traversable content-specific menus.

The memory 126 of the vehicle control system 115 has stored thereon a plurality of software systems 161 in addition to the GUI, each software system 161 including instructions that are executable by the processor system 102. The software systems 161 include an operating system 160 and the autonomous driving system (ADS) 170 for fully autonomous and/or semi-autonomous driving. The ADS 170 may in some embodiments include separate sub-modules configured to operate in each of one or more of the five generally recognized modes of autonomous or semi-autonomous vehicle operation: a driver assistance sub-module for operating in a driver assistance mode (level 1); a partial automation sub-module for operating in a partial automation mode (level 2); a conditional automation sub-module for operating in a conditional automation mode (level 3); a high automation sub-module for operating in a high automation mode (level 4); and/or a full automation sub-module for operating in a full automation mode (level 5).

The autonomous driving system 170 can include one or more software modules 168, including a computer vision module 172, an ODD identification module 174 for identifying an ODD according to example embodiments described herein, a localization module 177, a perception module 178, a planning module, and other modules 176. The memory 126 also has stored thereon instructions of each of the software modules 168 that can be invoked by the autonomous driving system 170. Other modules 176 may include for example a mapping module, a navigation module, a climate control module, a media player module, a telephone module and a messaging module. The instructions of the ODD identification module 174, when executed by the processor system 102, causes the operations of the methods described herein to be performed.

Although the ODD identification module 174 is shown as a separate module, one or more of the software modules 168, including the ODD identification module 174, may be combined with one or more of the other modules 176 in some embodiments.

The memory 126 also stores a variety of data 180. The data 180 may comprise data 182 received from the environment sensors 110, user data 184 comprising user preferences, settings and optionally personal media files (e.g., music, videos, directions, etc.), and a download cache 186 comprising data downloaded via the wireless transceivers 130 including, for example, data downloaded from network resources 250. The sensor data 182 may comprise camera data received from the cameras 112, LiDAR data received from the LiDAR units 114, RADAR data from the SAR units 116, IMU data from the IMU 118, compass data from the electronic compass 119, and other sensor data from other vehicle sensors 120. The camera data is representative of images of the environment 100 captured by the cameras 112. The LiDAR data is representative of point clouds for the environment generated by the LiDAR units 114. The RADAR data is also representative of point clouds for the environment generated by the SAR units 116. The download cache 186 may be deleted periodically, for example, after a predetermined amount of time. System software, software modules, specific device applications, or parts thereof, may be temporarily loaded into a volatile store, such as RAM 122, which is used for storing runtime data variables and other types of data and/or information. Data received by the vehicle control system 115 may also be stored in the RAM 122. Although specific functions are described for various types of memory, this is merely one example, and a different assignment of functions to types of memory may also be used.

Identification of the ODD for the ADS

The identification and updating of an operational design domain (ODD) for an autonomous driving system (ADS) will now be described.

Figure 3B:
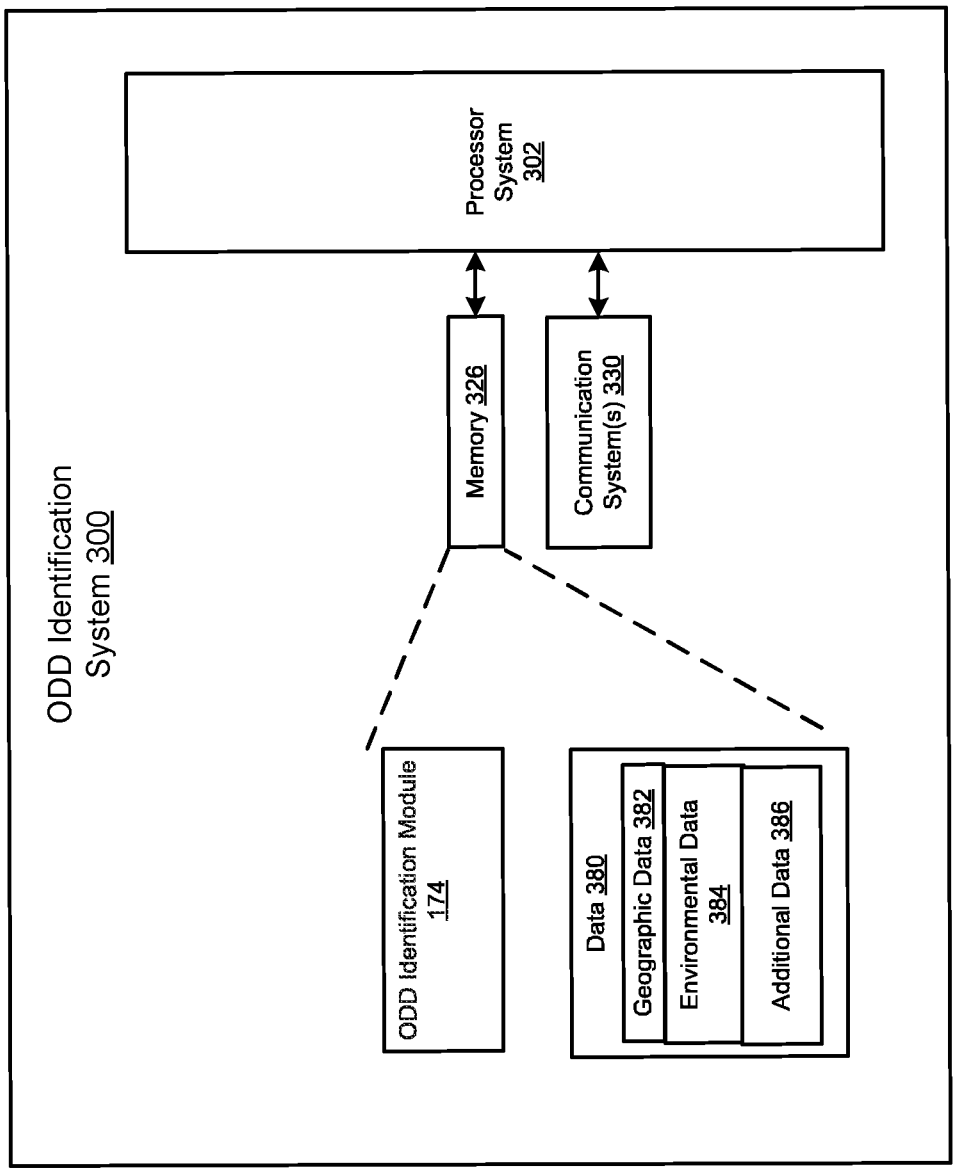
FIG. 3B is a block diagram of an ODD identification autonomous driving system in accordance with one example embodiment of the present disclosure.

In some embodiments, the ODD identification module 174 may be stored and executed on a system that is separate from the vehicle control system 115, such as a computer system located remotely from the vehicle 105. For example, in some embodiments the ODD identification module 174 resides on a memory within the server 240 and is executed by a processor system of the server 240 to identify and/or update an ODD for use by the ADS 170. The ODD definition data 414, 464 (FIG. 4) generated by the server 240 may be transferred to the vehicle control system 115 via the communication network shown in FIG. 2 or by other data transfer means. In other embodiments, the ODD identification module 174 may be implemented on one or more servers or processors on a distributed computing platform, or it may be a virtual machine provided on a cloud computing platform. FIG. 3B illustrates an example of a system (referred to hereinafter as an ODD identification system 300) that is separate from the vehicle control system 115.

Reference is next made to FIG. 3B which illustrates a block diagram of the ODD identification system 300 for identifying an operational design domain (ODD) for operation of an autonomous driving system (ADS) in accordance with example embodiments of the present disclosure. The ODD identification system 300 is located remotely from and in communication with the vehicle controller 115 via a communication network, such as wireless communication network, as described in further detail below.

The ODD identification system 300 comprises a processor system 302 coupled to a memory 326, and a communication system 330. The memory 326 stores the ODD identification system 174 and data 380. Data 380 includes geographic data 382, environmental data 384, and/or additional data 386 as further described below with respect to various methods of identifying and/or updating an ODD. The ODD identification system 300, when executing instructions of the ODD identification module 174, may make use of the data 380 stored on the memory 326 and/or received from other sources, such as over one or more communications systems 330. The ODD identification system 300 may reside on a vehicle 105, or be part of the vehicle 105, or may be in communication with the vehicle control system 115 of the vehicle 105.

Figures 4A, 4B:
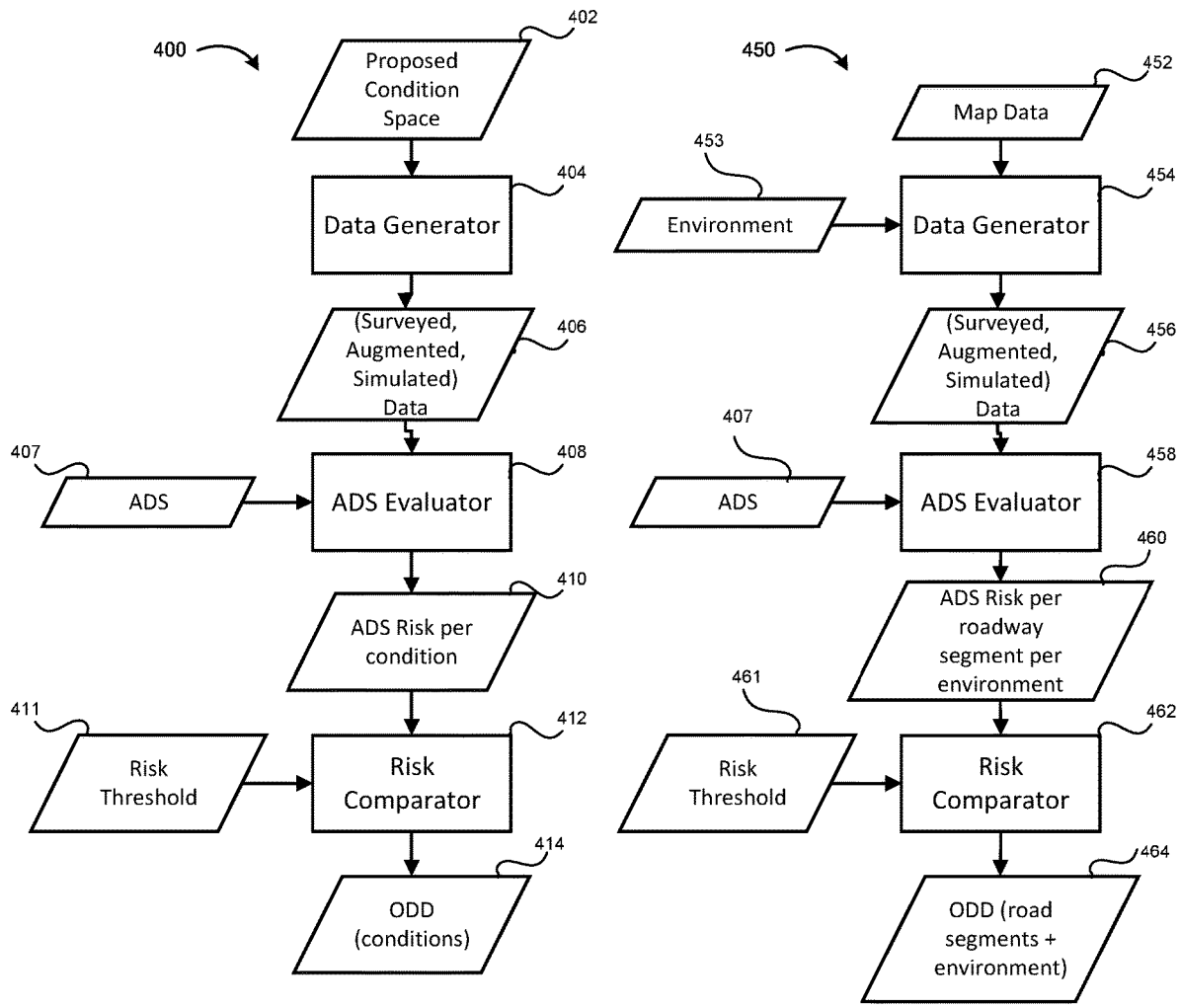
FIG. 4A is a system diagram showing the high-level operation of a system for identifying an ODD for an ADS in accordance with example embodiments of the present disclosure.
FIG. 4B is a system diagram showing the high-level operation of a system for identifying an ODD for an ADS incorporating environmental conditions in accordance with example embodiments of the present disclosure.

Examples of the ODD identification module 174 and methods described herein may use statistical data and risk tolerance defined in monetary (or some other) value to identify and determine if a given map and range of environmental conditions could be considered part of the ODD, even before deploying the ADS 170 in the vehicle 105. As shown in FIGS. 4A and 4B, described in greater details below, data representative of a map of the environment in which the vehicle 105 is to operate (hereinafter referred to as map data) and data representative of a range of environmental conditions (hereinafter referred to environmental range data) are used as the starting point to be considered as part of the ODD of the ADS 170. In some embodiments, such as the embodiment shown in FIG. 4A, the map data and environmental range data may be combined with each other and/or with other condition data to constitute proposed conditions space data 402, described in greater details below. A data generator 404 receives the proposed condition space data 402 as an input and generates a geographic dataset 406 that includes the map data with changing environmental conditions. The geographic dataset 406 reflects the true exposure (i.e., probability of finding an object) of various objects on the roadways corresponding to the map data. The ADS 170 is then tested on the geographic dataset 406 using an ADS evaluator 408 which calculates total risk for each roadway segment of the proposed ODD under the range of environmental conditions. The total risk is then compared with the pre-set risk threshold, and those roadway segments which have risk less than the threshold under a sub-range of the range of environmental conditions are identified and updated into the ODD with each roadway segment's corresponding sub-range of environmental conditions identified. The identified ODD then yields scenarios, such that the expected value of loss in case of failure of the ADS 170 is less than the pre-determined threshold.

FIG. 4A illustrates a high-level system diagram of a system 400 for identifying an operational design domain (ODD) for operation of ADS, for example ADS 170, in accordance with example embodiments of the present disclosure. It will be appreciated that the ODD identification module 174 includes the system 400. In some embodiments the system 400 is a software system that includes computer-readable instructions which are stored on the memory 126 and executed by the processor system 102 of the vehicle control system 115, for identifying an ODD for operation of the ADS 170. In other embodiments, as noted above with respect to the ODD identification system 300 of FIG. 3B, the ODD identification system 300 is a computer system that is remote in space and/or time from the vehicle 105 to be operated using the ADS 170. The ODD identification system 300 includes the ODD identification module 174 which includes the system 400 for identifying the ODD. The ODD of the ADS 170 may be included asynchronously with operation of the ADS 170, with the identified or updated ODD definition installed in the ADS 170 before deploying the vehicle 105. This installation may be carried out over the communication network shown in FIG. 2, or it may be carried out using any other data transfer technique, such as by manually uploading the ODD definition data via the data ports 142 using physical data storage media.

In some embodiments, the instructions for executing the method are tangibly stored on a non-transitory processor readable medium, as further described below. When executed by a processor, in instructions cause the processor to perform the methods described herein.

The system 400 of FIG. 4A begins with the data generator 404 receiving proposed condition space data 402. The proposed condition space data 402 is data that is representative of a proposed condition space. The proposed condition space is a multi-dimensional space defined by a range or set of proposed conditions under which the ADS 170 may operate. In some embodiments, the proposed condition space includes geographic conditions such as locations (e.g. specific roadways, roadway segments, or map boundaries), terrain type, or road repair conditions. The locations may comprise a proposed map, which may comprise an initial map boundary. In some other embodiments, the proposed condition space may also include map features, as described below.

The proposed condition space may also include other proposed conditions under which the ADS 170 may operate, including environmental conditions (such as lighting conditions, weather conditions, time of day conditions), vehicle status conditions (e.g. operation or performance status of various sensors and other vehicle systems), driver conditions (e.g. identity of driver, mental or physical status of driver), and so on. The proposed condition space thus defines an outer bound of an ODD identified by the system 400. The output of the system 400 is data representative of an ODD definition (referred to hereinafter as ODD 414/464). An ODD definition is a condition subspace that includes a portion of the proposed condition space. Thus, for example, when the proposed condition space includes locations and environmental conditions encompassing multiple roadway segments (e.g. the 1200 block of X street+Highway 10 between exits 5 and 6) and multiple weather conditions (clear+cloudy+light rain+heavy rain), the resulting ODD 414/464 identified by the system 400 may comprise some subset of the (roadway segments×weather conditions): e.g., the ODD 414/464 may encompass ((the 1200 block of X street)×(clear+cloudy+light rain))+((Highway 10 between exits 5 and 6)×(clear+cloudy)).

A data generator 404 receives the proposed condition space data 402 and generates a geographic dataset 406 using the proposed condition space data 402. In some embodiments, the proposed condition space data 452 includes data representative of map features (hereinafter referred to as map feature data). Map feature data may be generated when map features are derived from the proposed map as described in greater detail below. The map features may be derived from a pre-existing map. Alternatively, or in addition, the map features may be generated from data representative of the environment surrounding a survey vehicle (hereinafter called survey data) that is received from the survey vehicle's environment sensors while the survey vehicle operates on roadway segments within boundaries of the proposed map. In some embodiments, the map features may be generated from a virtual representation of the environment (hereinafter called simulated data, described in greater detail below) on roadway segments within boundaries of the proposed map. In some embodiments, the geographic dataset 406 is generated based on the proposed map data 452 alone, while in other embodiments the geographic dataset is generated by combining the environmental range data 453 with the proposed map data 452 (see FIG. 4B). The geographic dataset 406 therefore includes, for each roadway segment within the map boundaries, two different types of data. First, the geographic dataset 406 includes object data indicating the types of objects potentially present on the roadway, with an associated prevalence value for each object type. The object data may be derived from a combination of pre-existing map feature data, simulated data, and survey data. Second, the geographic dataset 406 includes sensor data indicating the data received by sensors of a surveying vehicle during travel on the roadway, and/or simulated sensor data received by a simulated vehicle virtually travelling on a simulation of the roadway. The sensor data may be gathered by a survey vehicle having higher-precision sensors than the environment sensors 110 of the vehicle 105; in such cases, the sensor data may be down-sampled before inclusion in the geographical dataset 406 to represent the precision level of the environment sensors 110 of the vehicle 105. The sensor data includes metadata indicating the real or virtual location of the survey vehicle and the real or virtual conditions (such as the environmental conditions surround in the survey vehicle, driver conditions, and/or vehicle status conditions) at each point in time represented by the sensor data.

Once a geographic dataset 406 is generated by the data generator process 404, the geographic dataset 406 may be further augmented by applying simulated variations of the environmental conditions to the sensor data to supplement the geographic dataset 406 with augmented data, as described in greater detail below. The geographic dataset 406 output by the data generator process 404 therefore comprises surveyed data, augmented data, simulated data, or any combination of surveyed data, augmented data, and simulated data.

Once the geographic dataset 406 has been generated, the performance of the ADS 170 is evaluated by an ADS evaluator 408 using the geographic dataset 406, as described in greater details below. The evaluation of the geographic dataset 406 by the ADS evaluator 408 results in a calculation of an ADS risk metric per roadway segment in the proposed map under each combination of conditions (such as environment conditions, vehicle status conditions, and/or driver conditions), shown as the ADS risk per condition 410 output by the ADS evaluator 408. A risk comparator 412 compares a risk threshold 411 to the ADS risk for each roadway segment and identifies an ODD 414 based on which roadway segments satisfy the comparison, and under what conditions. The risk threshold 411 may be defined in terms of risk tolerance, such as by a monetary (or some other) value, as described in greater detail below. The portions of the proposed condition space (e.g. the roadway segments within the proposed map, within a defined range of conditions) that have ADS risk 410 below the risk threshold 411 define a bounded-risk portion of the proposed condition space. The ODD 414 that is identified is output by the risk comparator 412, with the ODD 414 consisting of or being based on the bounded-risk portion of the proposed condition space.

With reference to FIG. 4B, a high-level system diagram of an example of a second system 450 of identifying an ODD is shown. It will be appreciated that the ODD identification module 174 includes the system 450. In some embodiments the system 450 is a software system that includes computer-readable instructions which are stored on the memory 126 and executed by the processor system 102 of the vehicle control system 115, for identifying an ODD for operation of the ADS 170. In some embodiments, the system 300 includes the ODD identification module 174 which includes the system 450 for identifying the ODD.

Referring to FIG. 4B, the data generator process 454 receives proposed map data 452 and data representative of the proposed range of environmental conditions 453 (hereinafter referred to as environmental range data 453). The proposed map data 452 and environmental range data 453 are used to generate a geographic dataset 456 including some combination of surveyed data, augmented data, and/or simulated data as described above with reference to the geographic dataset 406 generated in FIG. 4A. The ADS evaluator 458 receives the geographic dataset 456 and evaluates the performance of the ADS 170 using the geographic dataset 456 as described above with respect to FIG. 4. The ADS evaluator 458 outputs ADS risk data 460 indicative of a risk value for each roadway segment in the proposed map, under each environmental condition in the proposed range of environmental conditions. The risk comparator 462 receives the ADS risk data 460 and risk threshold data 461 indicative of a risk threshold value, compares the risk threshold value to a maximum risk metric value for each roadway segment in each environmental condition, and identifies an ODD 464 based on the comparison, as described in greater detail below. The ODD 464 is a multi-dimensional condition sub-space of (road segments×environmental conditions) having bounded risk (i.e., a sub-space that contains no combination of roadway segments and environmental conditions having a risk metric value higher than the risk threshold). Thus, the bounded-risk portion of the proposed condition space comprises a bounded-risk portion of the proposed map having a bounded risk under a bounded-risk sub-range of the proposed range of environmental conditions.

Thus, as described with reference to FIGS. 4A and 4B, example systems for identifying an ODD involve receiving, at a data generator 404/454, proposed condition space data 402 (which may be split into proposed map data 452 and proposed environmental range data 453), and the data generator 404/454 using the proposed condition space data to generate a geographic dataset 406/456. The performance of the ADS 170 is evaluated by an ADS evaluator 408/458 using the geographic dataset. The result of this evaluation is used by a risk comparator 412/462 to identify a bounded-risk portion of the proposed condition space represented by the proposed condition space data, and which is the ODD 414/464.

In some embodiments, the proposed map data 452 comprises data representative of GPS coordinates of roadway nodes and data representative of GPS coordinates of connections between the roadway nodes (i.e., roadway segments) selected such that the ODD is to be identified as a subset of the proposed map. The proposed map may include or correspond to a plurality of map features, and using the proposed condition space to generate the geographic dataset 406/456 comprises receiving proposed map data 452 that includes map feature data representative of the plurality of map features of the proposed map. The map features may include roadway nodes, roadway segments, routes, objects, paths, and/or other features of a proposed map or the region of space the proposed map represents. The map features may include a plurality of road nodes corresponding to locations on the proposed map and a plurality of roadway segments, each corresponding to a path between two of the road nodes. The map features may thus also include a plurality of routes between road nodes, each comprising a continuous sequence of one or more of the roadway segments. For a given proposed map, there could be multiple routes possible between two road nodes. Any route between two road nodes on a proposed map, traversing only roadway segments contained within the proposed map, would be considered to be a route contained within the proposed map.

The map features may also include a plurality of object types, identifying types of objects that could be encountered while the vehicle 105 is following a route in the proposed map. These object types may be represented as metadata attached to road nodes and roadway segments in a proposed map. The object types may be obtained from a survey of the environment in the proposed map (i.e., by driving the vehicle 105 in the environment corresponding to the proposed map and sensing objects in the environment using the plurality of environment sensors 110 of the vehicle 105). Object types may include one or more of the following: Stationary objects (e.g. Building, Pole, Pylon, Tree, Bridge, Barricade, Stone, Wall), Moving objects (e.g. Vehicle (e.g. Car, Pick-up truck, Truck, Semi-trailer, Streetcar, Train), Pedestrian, Animal), Traffic signs (e.g. stop, yield, parking, school zone), Traffic lights (categorized by e.g. Color (e.g. Red, Amber, Green, White), Shape (e.g. Round, Square, Ahead arrow, Left arrow, Right arrow, Pedestrian, "WALK", Hand, Bicycle, Counter (number)), Mode (e.g. Solid on, Off, Flashing)), Road markings (e.g. HOV lane, freeway entrance/exit, two-way traffic, intersection, yield), Lane boundary (categorized by e.g. Color (e.g. White, Yellow, Blue, Orange), Pattern (e.g. Solid, Double solid, Dashed, Double dashed, Dashed/solid, Solid/dashed, Botts-dots), and/or Lane (e.g. Driving, Non-driving, Bicycle, Intersection).

Except for the moving objects, all other objects listed above are typically static and hence are deterministic: i.e. they either exist on the proposed map or not. Moving objects are stochastic, and therefore, they are defined in terms of likelihood of encounter. Thus, each object type has one or more probabilities of encounter, each probability of encounter being associated with one of the roadway segments of the proposed map. In cases of static objects, this probability is typically 0 or 1, whereas for moving objects it is stochastic and may vary and be updated as more survey data or testing data is collected for that roadway segment. The probability of encountering an object on a given roadway segment may be referred to herein as the level of "exposure" for that object type in the context of assessing ADS risk.

Environmental conditions, as discussed herein, may include a number of different characteristics of the environment in which the ADS 170 is intended to operate. Ambient illumination [lx] may indicate ambient light in the environment in which the vehicle 105 is operating, parameterized as discretized levels (on a log scale) from 0.01 lx to 120000 lx. Visibility [m] may indicate the length of the atmosphere over which a beam of light travels before its luminous flux is reduced to 5% of its original value, parameterized as discretized levels from 0 m to 40000 m. Precipitation type may indicate Rain, Ice, Snow, Sleet, etc. Precipitation amount [mm/h] may indicate the intensity of precipitation, parameterized as discretized levels from 0.1 mm/h to 200 mm/h. Time of day may affect quantities that are not covered above, like traffic density at rush hour vs. at 3 a.m. Atmospheric pressure [Pa], Temperature [K], and Relative humidity [%] may also be included. It will be appreciated that these environmental conditions and parameterization techniques are intended only as examples and may be varied, omitted, or supplemented in various embodiments.

The geographic dataset 406/456 may contain surveyed data, augmented data, and/or simulated data. The geographic dataset may contain proposed map data 452 and all necessary metadata (such as map features including the road nodes, roadway segments, and exposure of objects in each roadway segment of the proposed map) required to calculate the performance of the ADS 170 as described below.

As described above, identifying a portion of the proposed condition space having bounded risk comprises comparing ADS risk to a risk threshold 411/461. In some embodiments, the ADS risk is evaluated by the ADS evaluator 408/458 using a risk metric, examples of which are described below in detail. To identify the bounded risk portion of the proposed map, a value of a risk metric is calculated for each route within the proposed map. The value of risk metric value for a route is typically the sum of the values of the risk metric for each segment in the route. The bounded risk portion of the proposed map is thus the set of routes that each have a value of a risk metric that is below a value of the risk threshold.

For embodiments using environment range data 453, the value of the risk metric is calculated for each route included in the proposed map, under each proposed environmental condition in the environmental range data. The bounded-risk portion of the proposed condition space is thus the set of combinations of (route×environmental condition) that each have a value for the risk metric that is below the value of the risk threshold.

This results in a bounded-risk portion of the proposed condition space defined by a maximum value for the risk metric (i.e. the risk metric value of the highest-risk route or the highest-risk combination of (route×environmental condition) within the bounded risk portion of the proposed condition space) that is below the risk threshold value. If the bounded-risk portion of the proposed condition space is used as the ODD, the ODD may be represented as a set of geographic data that contains GPS coordinates (i.e., road nodes) and connections between those road nodes (i.e., road segments), along with a range of environmental conditions, in which the ADS 170 would be able to operate in fully autonomous mode and theoretically have a risk lower than the predetermined risk threshold. This means any route possible between two road nodes in the ODD would also have a lower risk value than the value of the risk threshold.

The risk metric may be a quantified value of loss (in monetary units or otherwise) for driving in a particular segment of a proposed map within particular environmental conditions. The risk metric encapsulates the likelihood of an accident happening, based on performance of the ADS 170 in the presence of objects or map features in that section of the proposed map. In some embodiments, each route risk metric value is calculated by summing expected risk value for each of a plurality of object types present on the corresponding route. The expected risk value for an object type may in some embodiments be calculated as the product of three factors: severity, exposure, and likelihood of failure. Severity indicates an expected severity of failure of the ADS 170 to react appropriately to the object type on the route. Exposure, as noted above, indicates a prevalence or likelihood of encounter of the object type on the route. Likelihood of failure indicates the likelihood that the ADS 170 will fail to react appropriately to the object type on the route. The value of the risk metric for a route may thus be represented mathematically as:

$$\text{Risk } (\$) = \Sigma_i \text{Severity } (\$)_i * \text{Exposure } (\text{num})_i * \text{Likelihood } (\%)_i$$

Where the subscript $i$ denotes each object type in the proposed map or the proposed condition space.

Severity may denote an expected loss (quantified in monetary units or otherwise) in the case of a failure of the ADS 170 to react to an object. For example, the severity of failure of the ADS 170 to react to a traffic light may be high (hundreds to millions of dollars) while the severity of failure of the ADS 170 to detect a "welcome to xyz city" sign may be much lower. In some embodiments, severity may vary based on environmental conditions. Severity may be based on collected empirical data, such as historical insurance payouts, or severity may be determined by business strategies.

The value of a likelihood of failure of the ADS 170 for an object type may be based on the evaluation of the performance of the ADS 170 within the proposed range of environmental conditions using the geographic dataset. This likelihood or probability of failure is inversely related to the performance of the ADS 170. For example, if the perception module 178 of the ADS 170 is poor at detecting trucks, then the likelihood of failure of the ADS 170 to detecting a truck is high.

Exposure may be represented as a dimensionless, normalized number proportional to the probability of encountering a map feature or frequency of a particular object in the proposed map. For example, if the proposed map consists of highways, then exposure for pedestrians is very low while exposure for semi-trailers is high. Exposure data representative of the exposure may be generated in the course of surveying the area in the environment that aligns with an area in the proposed map and the exposure may be updated over time as more data is collected while the vehicle 105 is driven in the area that aligns with an area in the proposed map.

Thus, if the severity of failure of the ADS 170 for an object is high and the exposure for the ADS 170 is also high, then the ADS risk is very high for that segment of the proposed map. However, if the exposure for the ADS 170 for the same object or feature is very low, then the risk could be low. For example, exposure for pedestrians on a divided highways is very low. Therefore, if the proposed map consists of only divided highways, then the ADS 170 could potentially have low performance on pedestrian detection and still have risk under the risk threshold.

In some embodiments, the ODD identification module 174 has the further capability of alerting an operator (i.e., safety driver) of the vehicle 105 using the ADS 170 when the ADS 170 is operating in autonomous or semi-autonomous mode and the vehicle 105 is likely to exit the ODD. The ODD identification module 174 may determine that the vehicle 105 is likely to exit the ODD, either because the vehicle 105 is physically traveling onto a roadway segment or other location that is not included within the ODD, or because environmental conditions or other conditions defining the proposed condition space are changing or are likely to change shortly such that they would take the ADS 170 outside of the bounded-risk portion of the proposed condition space that defines the ODD for the vehicle 105. Upon detecting or determining that the vehicle 105 is likely to exit the ODD, the ODD identification module 174 alerts the operator of the vehicle 105 using some form of user output, such as a visual and/or audible alert conveyed via the touchscreen 136 and/or speakers 138 of the vehicle 105. Similarly, the ODD identification module 174 may provide an alert or notification when the vehicle 105 is likely to re-enter the ODD. By notifying the operator (i.e., the safety driver) when the vehicle 105 is operating under a bounded-risk sub-range of the proposed condition space (i.e. on a roadway segment and under a set of environmental conditions having bounded risk in combination), the operator (i.e., the safety driver) can maintain high alert only when necessary. Thus, the heavy reliance on the operator (i.e., the safety driver) of the vehicle 105 shown in current techniques could be drastically reduced. The final updated ODD is fed back into the vehicle 105, and the operator (i.e., the safety driver) can rely on the ADS 170 to alert the driver for ODD out-of-bounds cases. The focus of the operator (i.e., the safety driver) may therefore be to watch out for freak incidents or corner cases. These incidents or cases should ideally be the primary purpose for the focus of an operator (i.e., a safety driver) in the vehicle 105, instead of relying on the operator (i.e., the safety driver) to second-guess whether the ADS 170 will provide sensory feedback to ODD bounded cases.

In some embodiments, the ODD identification module 174 may continue to update the ODD after the initial identification of the ODD. The ODD identification module 174 may receive additional data, such as updated proposed map data (e.g. map data that identifies new proposed boundaries for the ODD), an updated geographic dataset (e.g. an updated geographic dataset including updated exposure data and/or updated sensor data), updated expected risk data (i.e. data representative of updated severity values for various object types), updated risk threshold data 411/461 (e.g. data representative of a new risk threshold), or updated ADS performance data (i.e. data representative of an updated likelihood of failure in relation to an object type on a roadway segment under an environmental condition). The ODD identification module 174 may then re-evaluate the performance of the ADS 170 using the data contained in the geographic dataset and the additional data, thereby updating the bounded-risk portion of the proposed condition space. The ODD identification module 174 may then update the ODD based on the updated bounded-risk portion of the proposed condition space.

Figure 5:
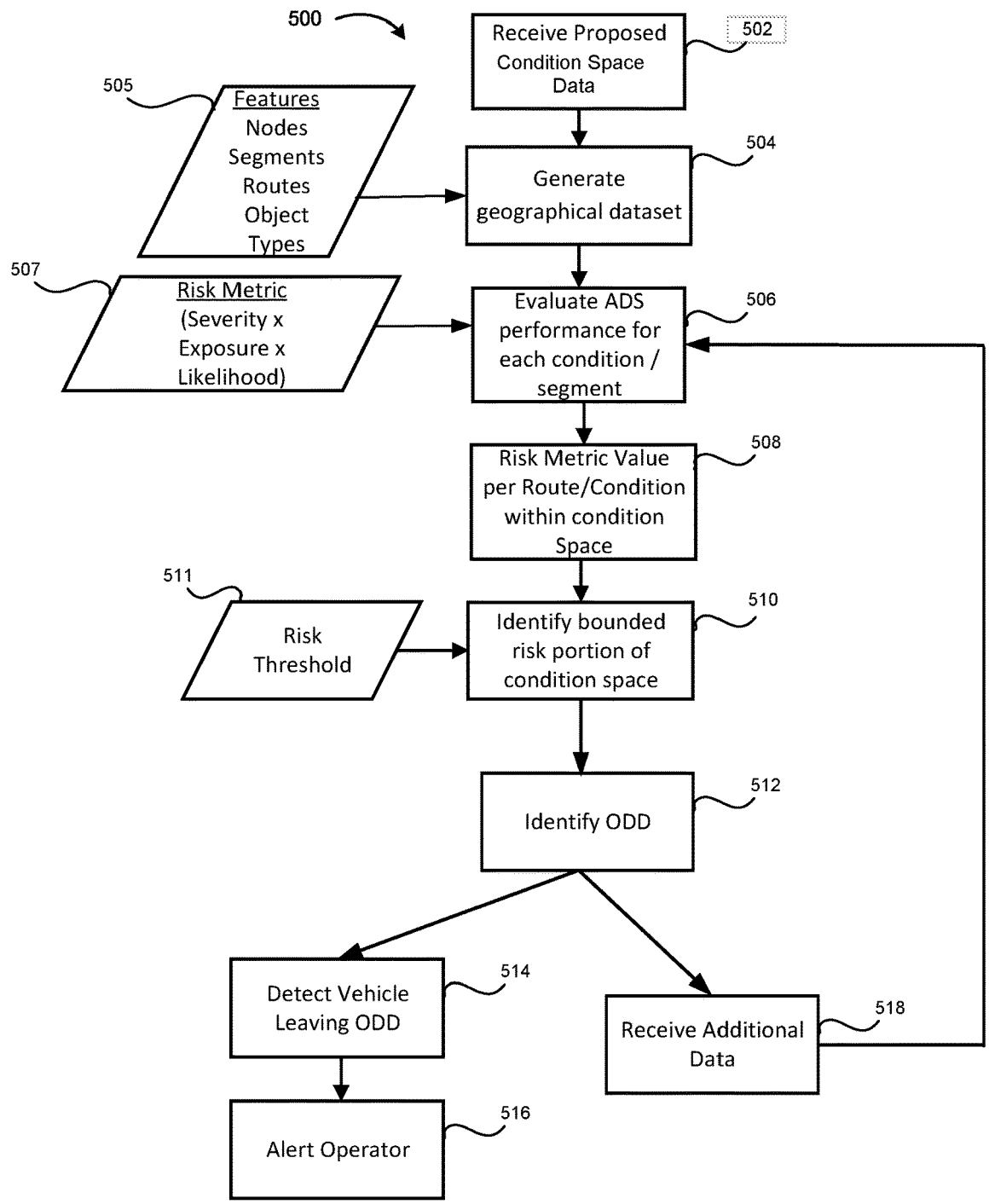
FIG. 5 is a flowchart showing the high-level operation of a method for identifying an ODD for an ADS incorporating environmental conditions in accordance with example embodiments of the present disclosure.

The overall operation of an example embodiment of a method 500 of identification of an ODD carried out by the ODD identification system 174 is shown FIG. 5. The ODD identification system 174 may include a software systems (e.g., systems 400, 450 described in FIGS. 4A and 4B). The method may be carried out by the processes of the systems

400, 450. Coding of the processes, the ODD identification module 174, and/or the software systems 400, 450 of the ODD identification module 174 for carrying out the steps of the method 500 is well within the scope of a person of ordinary skill in the art. The method 500 may contain additional or fewer steps than shown and described and the steps may be performed in a different order.

Referring to FIG. 5, at step 502, the ODD identification module 174 receives proposed condition space data 402, including proposed map data 452. At step 504, the geographic dataset 406/456 is generated based on the proposed condition space data 402. In some embodiments, the geographic dataset 406/456 is generated based at least in part on the proposed condition map data 452. The proposed map data 452 includes map feature data as described above. Map feature data 505 identifies roadway nodes, roadway segments, routes, paths, and object types, and is used by the ODD identification module 174 to generate the geographic dataset 406/456. At step 506, the performance of the ADS 170 is evaluated using the geographic dataset 406/456. A risk metric 507 (the product of severity×exposure×likelihood for each object type) is applied to the geographic dataset 406/456 to assess ADS risk for each condition within the proposed condition space (e.g. each roadway segment, or each roadway segment in each condition) to generate a risk metric value per route/condition within the proposed condition space 508. At step 510, the risk metric value 508 is compared to a risk threshold value 511 to identify a bounded-risk portion of the proposed condition space. For example, the bound-risk portion of the proposed condition space may be a set of combinations of roadway segments and conditions having risk bounded by the risk threshold value. At step 512, the ODD is identified based on the bounded-risk portion of the proposed conditions space.

At step 514, the method 500 detects that a vehicle 105 is likely to exit the bounded-risk condition subspace of the ODD. At step 516, in response to detecting a likelihood of exiting the ODD, an alert is generated and output to notify an operator (i.e., a safety driver) of the vehicle 105.

At step 518, additional data is received that may be relevant to identification of the ODD, and the method 500 loops back to the evaluation step 506 using the existing data and additional data to re-evaluate the performance of the ADS 170 and propagate through the remaining steps until the ODD is updated at step 512.

By using a systematic method for identifying and updating the ODD, safety may be quantified and concretized in a way that is necessary for testing and evaluating an ADS 170. Even if the initial proposed map or proposed condition space is decided based on business or strategic considerations, the identified or updated ODD is heavily backed by statistical data. This form of ODD identification and updating reduces the danger of prematurely running autonomous testing on a public road, which can akin to blind testing, especially with respect to the safety driver's perspective. Using data collected based on the proposed map, the ODD may be formulated without the need for testing on public roads.

More granular descriptions of various methods of operation of system 450 described in FIG. 4B are now described with reference to FIGS. 6, 7, 8, and 9.

Figure 6:
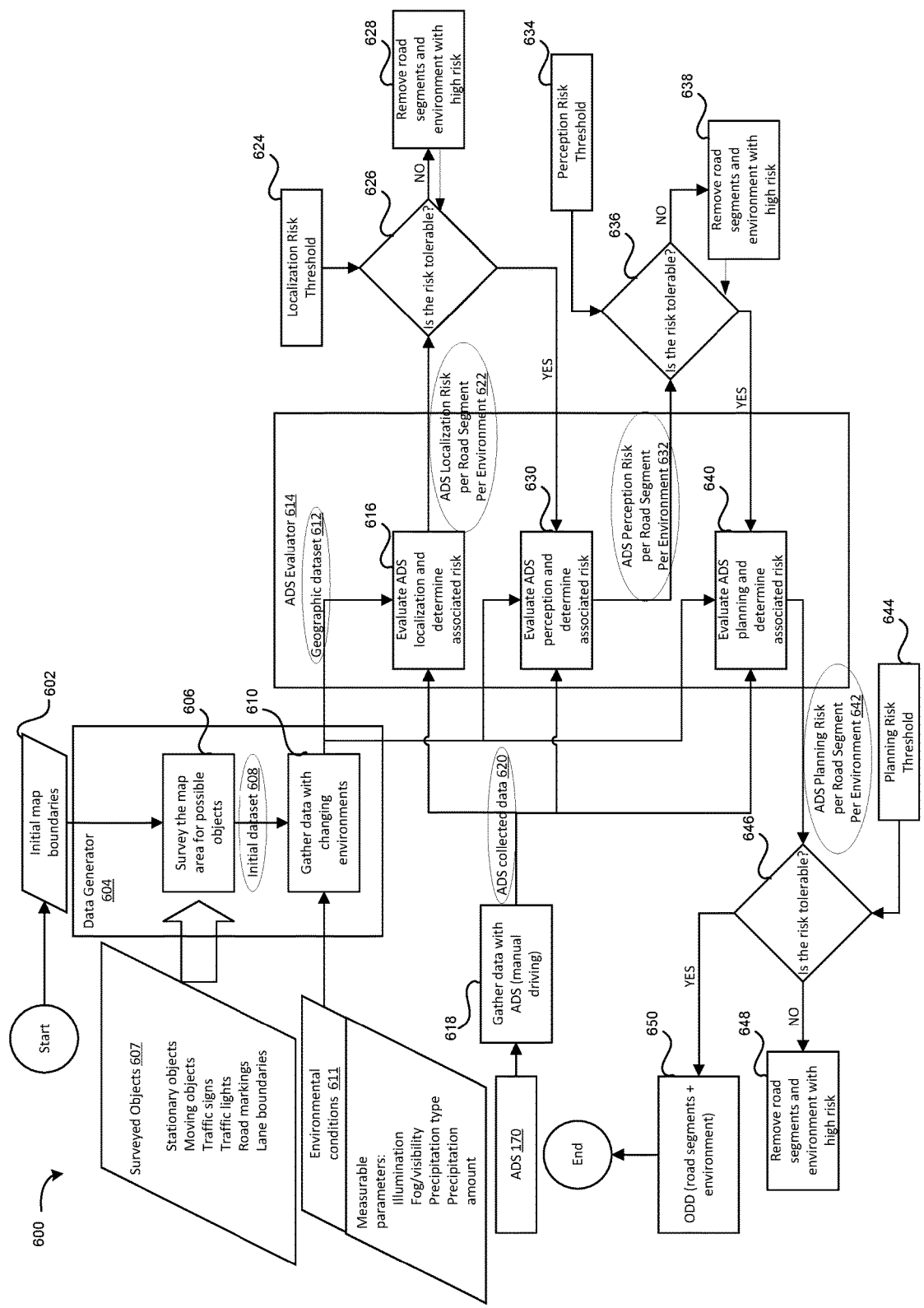
FIG. 6 is a flowchart showing the high-level operation of a first method for identifying an ODD for an ADS by comparing each of localization, perception and planning risk to its own risk threshold in accordance with example embodiments of the present disclosure.
Figure 7:
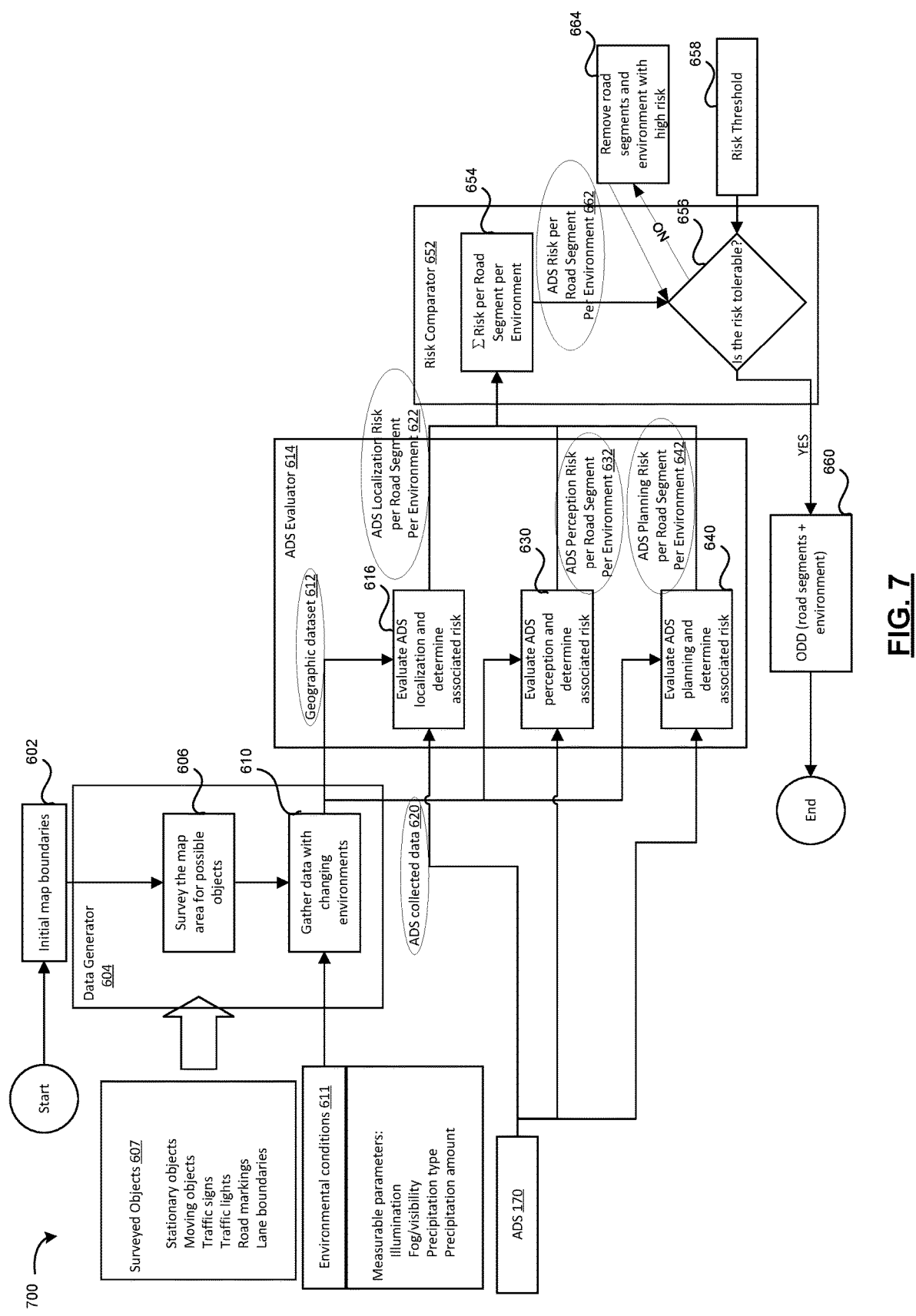
FIG. 7 is a flowchart showing the high-level operation of a second method for identifying an ODD for an ADS by comparing a combined localization, perception, and planning risk total to a risk threshold in accordance with example embodiments of the present disclosure.

With reference to FIG. 6, a first example method 600 of operation of system 450 is shown. The method 600 is performed by the system 450 as part of the ODD identification module 174. The method 600 evaluates the performance of an ADS, for example ADS 170, based on three modules of the ADS 170: the localization module 177, the perception module 178, and the planning module 179. The perception module 178 is a module of the ADS 170 that is responsible for detecting and tracking objects in the environment in which the vehicle 105 operates. The planning module 179 is a module of the ADS 170 that is responsible for determining a trajectory for the vehicle 105 in reaction to detected objects from the perception module 178. The localization module 177 is a module of the ADS 170 that is responsible for localization of the vehicle 105 on a map, such as the proposed map.

The first method 600 begins with the data generator 604 receiving the proposed map data 602 that includes proposed map data which is representative of proposed initial map boundaries (i.e., boundaries on an initial map) and environmental range data 611 that includes data representative of a proposed range of environmental conditions for operation of the ADS, for example ADS 170. The data generator 604 then uses the proposed condition space data 602 to generate a geographic dataset 612 in two steps. First, any map feature data present in the proposed map data 602 is extracted, and the environment of the area corresponding to the proposed map is surveyed using high precision environment sensors 110 to identify possible objects at step 606. (Surveyed objects 607 may, as noted above, include e.g. Stationary objects, Moving objects, Traffic signs, Traffic lights, Road markings, and/or Lane boundaries.) The surveying step 606 generates an initial geographic dataset 608 which may include object data for each roadway segment within the proposed map. Object data may include object prevalence data indicating a probability of encountering the object type on the given roadway segment (i.e. exposure).

Second, the object data for each road segment within the proposed map included in the initial geographic dataset 608 may be combined with environment range data 611 that includes environmental condition data that is representative of environmental conditions to generate the geographic dataset 612 by gathering sensor data for each combination of roadway segment and environmental condition through some combination of surveying, simulation, and augmentation at step 610. As noted above, environmental conditions may include e.g. illumination, visibility/fog, precipitation type, precipitation amount, and so on.

In some embodiments, the environmental condition data may be supplemented or replaced with augmented data. For example, data augmentation techniques may be used to simulate different environmental conditions as they affect the inputs of various types on environment sensor 110. Camera data may have brightness and contrast adjusted to simulate different illumination conditions; LiDAR data may have noise filters applied to simulate precipitation; and so on. An example data augmentation technique for simulating environmental conditions for performance evaluation of the ADS 170 is described at https://www.freecodecamp.org/.

Similarly, driving simulators may be used to simulate the driving course and evaluate the performance of the ADS 170. Driving simulators have been created by GM (The Matrix, a simulation of the streets of San Francisco, described at https://www.getcruise.com/ and https://venturebeat.com/) CARLA (http://carla.org/), by rFpro (http://www.rfpro.com/), and by nVidia (https://www.nvidia.com/. These types of simulators may be used to generate simulated geographic and/or environmental condition data for evaluating the ADS by providing map feature data and/or by generating simulated the sensor data that a survey vehicle would collect while driving on routes within the proposed map boundaries under a range of environmental conditions.

The geographic dataset 612 may be generated such that the object data for each road segment within the proposed map in the geographic dataset 613 is a probability of encountering different object types in each roadway segment reflects the true probability.

The ADS 170 is then evaluated using the geographic dataset 612 by an ADS evaluator 614. First, the ADS 170 and the environment sensors 110 are used to collect data while deployed in a vehicle 105 being manually driven (i.e. while the ADS 170 is not engaged in operating the vehicle) along routes within a proposed map at step 618. The data collected by the ADS 170 and the environment sensors 110 (referred to hereinafter as ADS collected data 620) includes sensor data gathered by the environment sensors 110 as well as ADS performance data indicating the internal localization, perception, and planning processes of the ADS in response to the sensor data. The ADS collected data 620 is used at step 616 to evaluate localization of the vehicle 105 by the localization module 177 and determine associated risk, i.e. a risk metric where the likelihood of failure of the ADS 170 is based only on the likelihood that the localization module 177 will fail. The evaluation of localization risk at step 616 generates a localization risk per road segment per environment 622 (hereinafter referred to as localization risk 622), which is compared to a localization risk threshold 624 at step 626. If the localization risk 622 is determined to be not tolerable (i.e., a value of the localization risk 622 is higher than a value of the localization risk threshold 624), then roadway segments and environments (or combinations thereof) having high risk are removed from a tentative ODD subspace at step 628. The tentative ODD subspace is an unfinished version of the ODD that is still being refined by the system 450. The removal of roadway segments and environments (or combinations thereof) having high risk from the tentative ODD subspace at step 628 continues until the localization risk 622 falls below the localization risk threshold 624 (i.e., until the value of the localization risk 622 is less than the value of the localization risk threshold 634).

Once the localization risk 622 is tolerable (i.e., the value of the localization risk is less than a value of the localization risk threshold 624), then the method 600 proceeds to step 630. The perception module 178 of the ADS 170 is evaluated to determine associated perception risk, i.e. a risk metric where the likelihood of failure of the ADS 170 is based only on the likelihood that the perception module 178 will fail. As with the localization module 177, the ADS evaluator 614 generates a perception risk per roadway segment per environment (hereinafter called perception risk 632), which is compared to a perception risk threshold 634 at step 636. If the perception risk is not tolerable (i.e., the value of the perception risk 632 is greater than or equal to the risk threshold 634), then roadway segments and environments (or combinations thereof) having high risk are removed from the tentative ODD subspace at step 638. The removal of roadway segments and environments (or combinations thereof) having high risk from the tentative ODD subspace at step 638 continues until the perception risk 632 falls below the perception risk threshold 634 (i.e., until the value of the perception risk 632 is less than the value of the perception risk threshold 634).

Once the perception risk 632 is tolerable (i.e., the value of the perception risk 632 is less than the value of the risk threshold 634), then the method 600 proceeds to step 640. The planning module 179 of the ADS 170 is evaluated to determine associated planning risk, i.e. a risk metric where the likelihood of failure of the ADS 170 is based only on the likelihood that the planning module 179 will fail. As with the localization module 177 and perception module 178, the ADS evaluator 614 generates a planning risk per road segment per environment 642 (hereinafter referred to a planning risk 642), which is compared to a planning risk threshold 644 at step 646. If the planning risk 642 is not tolerable (i.e., a value of the planning risk 642 is greater than or equal to a value of the planning risk threshold 644), then roadway segments and environments (or combinations thereof) having high risk are removed from the tentative ODD subspace at step 648. The removal of roadway segments and environments (or combinations thereof) having high risk from the tentative ODD subspace at step 648 continues until the planning 642 risk falls below the planning risk threshold 644 (until the value of the planning risk 642 is less than the value of the planning risk threshold 644).

At final step 650, the ODD is identified as the remaining set of roadway segments and environmental or other conditions that have not been eliminated from the tentative ODD subspace at steps 628, 638, or 648. Thus, each combination of (roadway segment under environmental condition) falls within a bounded risk for each of the localization module 177, perception module 178, and the planning module.

A second method 700 also relies on evaluation of the localization module 177, the perception module 178, and planning module 179, but the method 700 compares the total risk from all three of the localization, perception, and planning modules 177, 178, 179 to a single risk threshold to identify the ODD. The initial steps and processes are identical to those of first method 600. However, the localization risk 622, perception risk 632, and planning risk 642 are not individually compared to individual localization, perception, and planning risk thresholds to eliminate roadway segments and environmental conditions from the tentative ODD subspace. Instead, a risk comparator 652 sums the localization risk 622, perception risk 632, and planning risk 642 at step 654 to generate a total ADS risk per road segment per environment 662 (hereinafter referred to as total ADS risk 662). The total ADS risk 662 is compared to an overall risk threshold 658 at step 656. If the total ADS risk 662 is below the overall risk threshold 658 (i.e., the value of the total risk 662 is less than a value of the overall risk threshold 658), the ODD is identified at step 660 to include the roadway segments and environmental conditions. If the total ADS risk 662 is above the overall risk threshold 658 (i.e., the value of the total risk 662 is greater than or equal to a value of the overall risk threshold 658), step 664 removes roadway segments and environmental conditions with high risk from the proposed condition space until the overall risk threshold 658 is reached.

Figure 8:
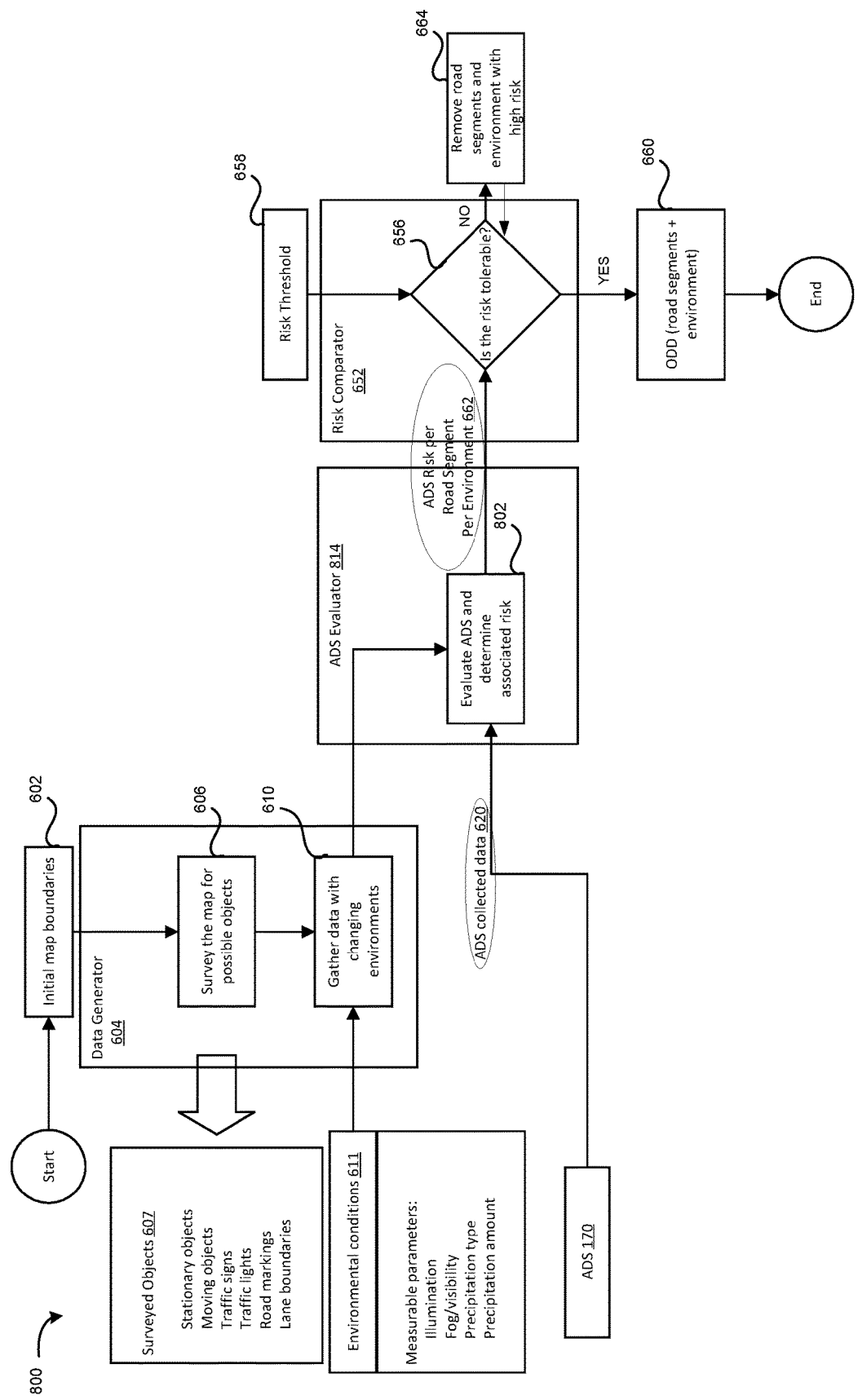
FIG. 8 is a flowchart showing the high-level operation of a third method for identifying an ODD for an ADS by comparing an overall risk to a risk threshold in accordance with example embodiments of the present disclosure.

A third method 800 shown in FIG. 8 is agnostic as to the different modules making up the ADS 170. Instead of separately evaluating localization risk, perception risk, and planning risk as described above, it may assess ADS risk using any of a number of risk assessment metrics, including a holistic risk metric that measures overall possibility of failure to the ADS 170. The third method 800 duplicates the steps and processes of the second method 700 except in its ADS evaluator 814, which only performs a single step 802 in which total ADS risk is determined using a risk metric.

This third method 800 potentially reduces the complexity of designing separate ADS evaluators for each of the localization module 177, the perception module 178, and the planning module 179 of the ADS 170. Also, this may relieve the dependencies between the localization, perception, and planning modules imposed by the ADS evaluators 408, 458, 514, 614. An ADS whose ODD is being identified by the ODD identification module 174 can have other modules instead of or in addition to traditional localization, perception and planning modules 177, 178, 179, yet still work in this third method 800 so long as the inputs and outputs are kept the same. Furthermore, the third method 800 may more accurately capture overall failure risk of the ADS 170 in cases where the likelihood of failure of the localization module 177, failure of the perception module 178, and/or failure of the planning module 179 are not independent of each other and so may combine in a non-linear fashion.

Figure 9:
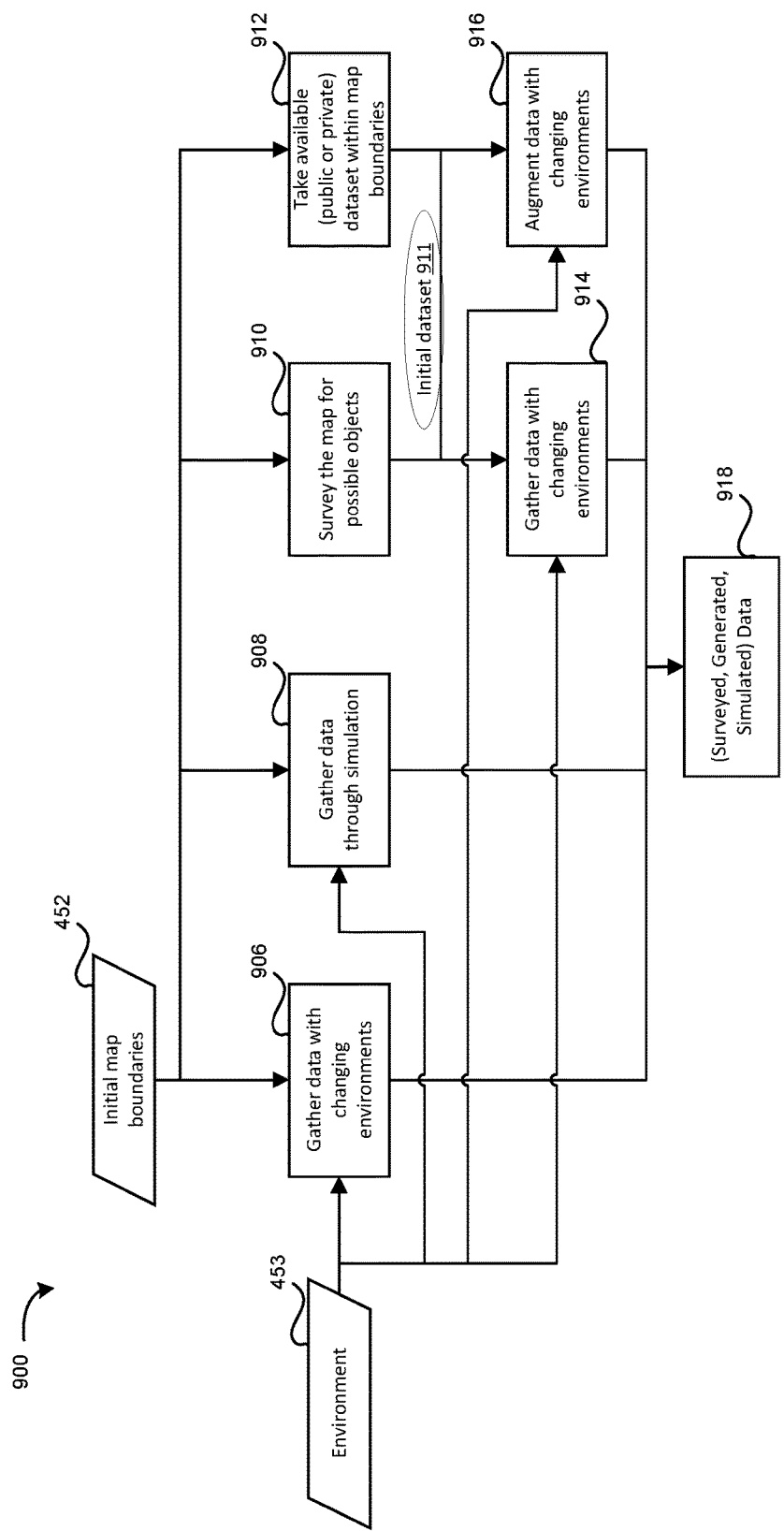
FIG. 9 is a flowchart showing the high-level operation of a method for generating and/or augmenting condition data for use in evaluating ADS performance in accordance with example embodiments of the present disclosure.

A method 900 for generating and/or augmenting a geographic dataset for use in evaluating an ADS, such as the ADS 170, is shown in the flowchart of FIG. 9. Method 900 is a more detailed representation of the data generation process performed by the data generator 454 shown in FIG. 4B. Method 900 shows the different techniques by which a geographic dataset may be generated using the same input of proposed map data 452 and proposed environmental range data 453 (see FIG. 4B), shown here as including map data representative of initial proposed map boundaries 452 and environment range data conditions 453.

At step 906, by manually driving a survey vehicle, such as vehicle 105, within the boundaries of the proposed map with higher or at least equal precision environment sensors 110 mounted to the survey vehicle, data is collected in the context of changing environmental conditions. The data collection may run for several days to effectively collect data with the necessary redundancy and variety of environmental conditions to perform an effective evaluation of an ADS, such as ADS 170. A potential benefit of using this approach is that the collected data represents the actual environment surrounding the vehicle.

At step 908, proposed condition space data 452 that includes data representative of geographic conditions and environmental range data 453 can be generated through simulation as described above. Potential benefits of using this approach are the time saved and the possibility of doing incremental changes to the environment conditions 904.

At step 910, the roadway segments within the boundaries of the map are surveyed for possible objects in each roadway segment. Once the map survey is complete, this can form the initial geographic dataset 608 as described above with reference to FIG. 6. The initial geographic dataset 608 may include object data for each roadway segment within the proposed map. Object data may include object prevalence data indicating a probability of encountering the object type on the given roadway segment (i.e. exposure).

Further data is then gathered at step 914 by performing further surveys under changing environmental conditions 904 but keeping the object prevalence data the same or close to that of the initial geographic dataset 911.

It is possible that there already exists an available dataset within the map boundaries for use as an initial geographic dataset. The available dataset may be acquired at step 912 and then used at step 916 to augment the existing available dataset with changing environmental conditions 904, as described above.

A data generation process may employ any combination of these various steps to further add variety and robustness to the surveyed data and generate a final geographic dataset 918 containing sufficient combinations of roadway segment and environmental condition data. To remove the bias associated with a particular set of data and properly evaluate the ADS risk, a significantly large amount of data is required for the ADS evaluator 454 to evaluate the ADS 170. It is possible to use multiple methods described above to generate the geographic dataset. The ADS 170 under test may then be rigorously evaluated for risk of failure in order to identify the ODD.

As noted above, the above described systems and methods can in some embodiments be implemented without the vehicle (offline). The environment condition data and map data do not necessarily need to be provided as real-time data. The entire system can be operated on simulated data, real data or synthetic data. For example, the sensitivity for each environmental variable can be calculated by adjusting environmental condition data such as ambient illumination. This way, not only can the environmental condition parameters be fine-tuned, but the system will also have more robust statistic data to determine the threshold.

Acquiring exactly the required data for evaluating the ADS can be a significant challenge. The example systems and methods described herein may be capable of taking as inputs simulated or synthetic data (i.e. data generated using simulated environments or generated by applying simulated environmental conditions to sensor data, as described above) and testing the capabilities of the ADS in different environmental conditions. This potentially provides the system with more robust statistical data. In addition, a large variety of different scenarios can be generated by synthesizing the collected data.

The systems and methods for identifying and updating an ODD described herein can also potentially be broadened to cover safety-critical applications of learned (e.g. machine learning, logistic regression) modules and/or applications where a map and/or environment conditions are required.

The steps and/or operations in the flowcharts and drawings described herein are for purposes of example only. There may be many variations to these steps and/or operations without departing from the teachings of the present disclosure. For instance, the steps may be performed in a differing order, or steps may be added, deleted, or modified.

The coding of software for carrying out the above-described methods described is within the scope of a person of ordinary skill in the art having regard to the present disclosure. Machine-readable code executable by one or more processors of one or more respective devices to perform the above-described method may be stored in a machine-readable medium such as the memory of the data manager. The terms "software" and "firmware" are interchangeable within the present disclosure and comprise any computer program stored in memory for execution by a processor, comprising Random Access Memory (RAM) memory, Read Only Memory (ROM) memory, EPROM memory, electrically EPROM (EEPROM) memory, and non-volatile RAM (NVRAM) memory. The above memory types are examples only, and are thus not limiting as to the types of memory usable for storage of a computer program.

General

All values and sub-ranges within disclosed ranges are also disclosed. Also, although the systems, devices and processes disclosed and shown herein may comprise a specific plurality of elements, the systems, devices and assemblies may be modified to comprise additional or fewer of such elements. Although several example embodiments are described herein, modifications, adaptations, and other implementations are possible. For example, substitutions, additions, or modifications may be made to the elements illustrated in the drawings, and the example methods described herein may be modified by substituting, reordering, or adding steps to the disclosed methods. In addition, numerous specific details are set forth to provide a thorough understanding of the example embodiments described herein. It will, however, be understood by those of ordinary skill in the art that the example embodiments described herein may be practiced without these specific details. Furthermore, well-known methods, procedures, and elements have not been described in detail so as not to obscure the example embodiments described herein. The subject matter described herein intends to cover and embrace all suitable changes in technology.

Although the present disclosure is described at least in part in terms of methods, a person of ordinary skill in the art will understand that the present disclosure is also directed to the various elements for performing at least some of the aspects and features of the described methods, be it by way of hardware, software or a combination thereof. Accordingly, the technical solution of the present disclosure may be embodied in a non-volatile or non-transitory machine-readable medium (e.g., optical disk, flash memory, etc.) having stored thereon executable instructions tangibly stored thereon that enable a processing device to execute examples of the methods disclosed herein.

The term "processor" may comprise any programmable system comprising systems using microprocessors/controllers or nanoprocessors/controllers, digital signal processors (DSPs), application specific integrated circuits (ASICs), field-programmable gate arrays (FPGAs) reduced instruction set circuits (RISCs), logic circuits, and any other circuit or processor capable of executing the functions described herein. The term "database" may refer to either a body of data, a relational database management system (RDBMS), or to both. As used herein, a database may comprise any collection of data comprising hierarchical databases, relational databases, flat file databases, object-relational databases, object oriented databases, and any other structured collection of records or data that is stored in a computer system. The above examples are example only, and thus are not intended to limit in any way the definition and/or meaning of the terms "processor" or "database".

The present disclosure may be embodied in other specific forms without departing from the subject matter of the claims. The described example embodiments are to be considered in all respects as being only illustrative and not restrictive. The present disclosure intends to cover and embrace all suitable changes in technology. The scope of the present disclosure is, therefore, described by the appended claims rather than by the foregoing description. The scope of the claims should not be limited by the embodiments set forth in the examples, but should be given the broadest interpretation consistent with the description as a whole.

The invention claimed is:

1. A method for operating a vehicle using an autonomous driving system (ADS), the method comprising:
   prior to operating the vehicle, using the ADS, within an environment corresponding to a proposed map:
     generating an operational design domain (ODD) definition, at a computer system, by:
       receiving proposed condition space data comprising proposed map data representative of the proposed map;
       processing the proposed map data to generate a geographic dataset comprising a plurality of map features of the proposed map, the plurality of map features including:
         a plurality of roadway segments on the proposed map; and
         a plurality of routes on the proposed map, each route comprising one or more of the roadway segments;
       obtaining ADS performance data, representative of performance of the ADS, comprising at least:
         simulated ADS data, generated based on performance of the ADS in relation to simulated environmental data;
       processing the proposed condition space data, the geographic dataset, and the ADS performance data to generate ADS risk data including, for each route of the plurality of routes, one or more route risk metric values, each route risk metric value being representative of a level of risk of operating the ADS on the route; and
       processing the ADS risk data to generate the ODD definition, the ODD definition defining an ODD consisting of a bounded-risk portion of the proposed condition space, by:
         identifying a first one or more routes consisting of each route of the plurality of routes having at least one route risk metric value of the one or more route risk metric values falling below a risk threshold, the first one or more routes defining the bounded-risk portion of the proposed condition space; and
         identifying a second one or more routes consisting of each route of the plurality of routes having no route risk metric value of the one or more route risk metric values falling below the risk threshold, the second one or more routes being excluded from the bounded-risk portion of the proposed condition space;
     after the ODD definition has been generated, storing the ODD definition in a memory of the vehicle; and
   after the ODD has been generated and stored in the memory, restricting the operation of the vehicle, using the ADS, to within the ODD defined by the ODD definition stored in the memory.

2. The method of claim 1, wherein:
   the proposed condition space data further comprises environmental range data representative of a proposed range of environmental conditions;
   processing the proposed condition space data, the geographic dataset, and the ADS performance data to generate the ADS risk data further comprises processing the environmental range data;
   for each route of the plurality of routes, each respective route risk metric value of one or more route risk metric values is representative of a respective level of risk of operating the ADS on the route in the presence of a respective environmental condition of the proposed range of environmental conditions; and
   the bounded-risk portion of the proposed condition space is further defined by, for each route of the first one or more routes, one or more environmental conditions of the proposed range of environmental conditions for which the route risk metric value representative of a level of risk of operating the ADS on the route in the presence of the environmental condition falls below the risk threshold.

3. The method of claim 2, wherein the map features of the proposed map further comprise:
   a plurality of nodes corresponding to locations on the proposed map,
     each roadway segment corresponding to a path between two of the nodes; and
   a plurality of object types, each object type having one or more probabilities of encounter, each probability of encounter being associated with one of the roadway segments.

4. The method of claim 3, wherein each route risk metric value is calculated by summing an expected risk for each of a plurality of object types present on the corresponding route, the expected risk for an object type being calculated as the product of:
  a severity value indicating an expected severity of failure of the ADS to react appropriately to the object type on the route;
  an exposure value indicating a prevalence of the object type on the route; and
  a likelihood of failure value indicating the likelihood that the ADS will fail to react appropriately to the object type on the route; and
  wherein the likelihood of failure value is based on the ADS performance data.

5. The method of claim 4, wherein processing the proposed condition space data, the geographic dataset, and the ADS performance data to generate the ADS risk data further comprises, for each object type on the corresponding route:
  obtaining the severity value based on empirical data relating to insurance payouts.

6. A non-transitory processor readable medium having tangibly stored thereon executable instructions that, when executed by a processor, cause the processor to perform the method of claim 2.

7. The method of claim 1, further comprising:
  in response to determining that the vehicle is likely to exit the operational design domain, generating an alert for presentation to an operator of the vehicle.

8. The method of claim 1, further comprising, after operating the vehicle within the ODD:
  receiving, at the computer system, additional data;
  processing, at the computer system, the proposed condition space data, the geographic dataset, and the additional data to generate updated ADS risk data including, for each route of the plurality of routes, one or more route risk metric values, each route risk metric value being representative of a level of risk of operating the ADS on the route, thereby defining an updated bounded-risk portion of the proposed condition space;
  processing the updated bounded-risk portion of the proposed condition space to generate an updated operational design domain definition defining an updated ODD consisting of the updated bounded-risk portion of the proposed condition space; and
  storing the updated operational design domain definition in the memory.

9. The method of claim 1, wherein the ADS performance data further comprises:
  collected ADS data, collected from the ADS while the vehicle, equipped with the ADS, is being manually driven in a real world environment, and while the ADS is not engaged in operating the vehicle.

10. A non-transitory processor readable medium having tangibly stored thereon executable instructions that, when executed by a processor, cause the processor to perform the method of claim 1.

11. The method of claim 1, wherein:
  the simulated ADS data is generated by:
    obtaining simulated data based on simulation of:
      at least a portion of the proposed condition space data; and
      at least a portion of the geographic dataset; and
    evaluating performance of the ADS using the simulated data, thereby generating the simulated ADS data.

12. An autonomous vehicle equipped with an autonomous driving system (ADS), comprising:
  a processor system; and
  a memory coupled to the processor system, the memory tangibly storing thereon executable instructions that, when executed by the processor system, cause the processor system to:
    prior to operating the vehicle, using an autonomous driving system (ADS) of the vehicle, within the environment corresponding to a proposed map:
      receive proposed condition space data comprising proposed map data representative of the proposed map;
      process the proposed map data to generate a geographic dataset comprising a plurality of map features of the proposed map, the plurality of map features including:
        a plurality of roadway segments on the proposed map; and
        a plurality of routes on the proposed map, each route comprising one or more of the roadway segments;
      obtain ADS performance data, representative of performance of the ADS, comprising at least:
        simulated ADS data, generated based on performance of the ADS in relation to simulated environmental data;
      process the proposed condition space data, the geographic dataset, and the ADS performance data to generate ADS risk data including, for each route of the plurality of routes, one or more route risk metric values, each route risk metric value being representative of a level of risk of operating the ADS on the route; and
      process the ADS risk data to generate an operational design domain (ODD) definition, the ODD definition defining an ODD consisting of a bounded-risk portion of the proposed condition space, by:
        identifying a first one or more routes consisting of each route of the plurality of routes having at least one route risk metric value of the one or more route risk metric values falling below a risk threshold, the first one or more routes defining the bounded-risk portion of the proposed condition space; and
        identifying a second one or more routes consisting of each route of the plurality of routes having no route risk metric value of the one or more route risk metric values falling below the risk threshold, the second one or more routes being excluded from the bounded-risk portion of the proposed condition space;
    after the ODD definition has been generated, store the ODD definition in the memory; and
    after the ODD has been generated and stored in the memory, restrict the operation of the vehicle, using the ADS, to within the ODD defined by the ODD definition stored in the memory.

13. The vehicle of claim 12, wherein:
  the proposed condition space data further comprises environmental range data representative of a proposed range of environmental conditions;
  processing the proposed condition space data, the geographic dataset, and the ADS performance data to generate the ADS risk data further comprises processing the environmental range data;
  for each route of the plurality of routes, each respective route risk metric value of the one or more route risk metric values is representative of a respective level of risk of operating the ADS on the route in the presence of a respective environmental condition of the proposed range of environmental conditions; and the bounded-risk portion of the proposed condition space is further defined by, for each route of the first one or more routes, one or more environmental conditions of the proposed range of environmental conditions for which the route risk metric value representative of a level of risk of operating the ADS on the route in the presence of the environmental condition falls below the risk threshold.

14. The vehicle of claim 13, wherein the map features of the proposed map further comprise:

a plurality of nodes corresponding to locations on the proposed map, each roadway segment corresponding to a path between two of the nodes; and a plurality of object types, each object type having one or more probabilities of encounter, each probability of encounter being associated with one of the roadway segments.

15. The vehicle of claim 14, wherein each route risk metric value is calculated by summing an expected risk for each of a plurality of object types present on the corresponding route, the expected risk for an object type being calculated as the product of:

a severity value indicating an expected severity of failure of the ADS to react appropriately to the object type on the route;

an exposure value indicating a prevalence of the object type on the route; and a likelihood of failure value indicating the likelihood that the ADS will fail to react appropriately to the object type on the route; and wherein the likelihood of failure value is based on the ADS performance data.

16. The vehicle of claim 15, wherein processing the proposed condition space data, the geographic dataset, and the ADS performance data to generate the ADS risk data further comprises, for each object type on the corresponding route:

obtaining the severity value based on empirical data relating to insurance payouts.

17. The vehicle of claim 12, wherein the instructions, when executed by the processor system, further cause the processor system to:

in response to determining that the vehicle is likely to exit the operational design domain, generating an alert for presentation to an operator of the vehicle.

18. The vehicle of claim 12, wherein the instructions, when executed by the processor system, further cause the processor system to, after generating operating the vehicle within the operational design domain:

receive additional data;

process the proposed condition space data, the geographic dataset, and the additional data to generate updated ADS risk data including, for each route of the plurality of routes, one or more route risk metric values, each route risk metric value being representative of a level of risk of operating the ADS on the route, thereby defining an updated bounded-risk portion of the proposed condition space;

process the updated bounded-risk portion of the proposed condition space to generate an updated operational design domain definition defining an updated ODD consisting of the updated bounded-risk portion of the proposed condition space; and store the updated operational design domain definition in the memory.

19. The vehicle of claim 12, wherein the ADS performance data further comprises:

collected ADS data, collected from the ADS while the vehicle, equipped with the ADS, is being manually driven in a real world environment, and while the ADS is not engaged in operating the vehicle.

20. The vehicle of claim 12, wherein:

the simulated ADS data is generated by:

obtaining simulated data based on simulation of:

at least a portion of the proposed condition space data; and at least a portion of the geographic dataset; and evaluating performance of the ADS using the simulated data, thereby generating the simulated ADS data.

* * * * *